United States Patent
Babich et al.

(12)

(10) Patent No.: US 10,346,422 B2
(45) Date of Patent: *Jul. 9, 2019

(54) USE OF PROXY OBJECTS FOR INTEGRATION BETWEEN A CONTENT MANAGEMENT SYSTEM AND A CASE MANAGEMENT SYSTEM

(71) Applicant: International Business Machines Corporation, Armonk, NY (US)

(72) Inventors: Alan F. Babich, Mission Viejo, CA (US); Mike A. Marin, Laguna Hills, CA (US); Mimi P. Vo, San Jose, CA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 70 days.

This patent is subject to a terminal disclaimer.

(21) Appl. No.: 13/655,004

(22) Filed: Oct. 18, 2012

(65) Prior Publication Data

US 2014/0114918 A1    Apr. 24, 2014

(51) Int. Cl.
   G06F 16/27    (2019.01)
   G06F 16/188   (2019.01)
   G06F 16/182   (2019.01)
   G06F 16/23    (2019.01)

(52) U.S. Cl.
   CPC ............ *G06F 16/27* (2019.01); *G06F 16/184* (2019.01); *G06F 16/188* (2019.01); *G06F 16/2358* (2019.01); *G06F 16/2365* (2019.01)

(58) Field of Classification Search
   None
   See application file for complete search history.

(56) References Cited

U.S. PATENT DOCUMENTS

| | | | | |
|---|---|---|---|---|
| 4,973,086 A | * | 11/1990 | Donnelly | B42F 21/00 281/38 |
| 5,151,989 A | * | 9/1992 | Johnson et al. | |
| 5,191,522 A | * | 3/1993 | Bosco et al. | 705/4 |
| 5,513,314 A | * | 4/1996 | Kandasamy et al. | 714/6.31 |
| 5,623,666 A | * | 4/1997 | Pike et al. | |
| 5,630,101 A | * | 5/1997 | Sieffert | H04N 1/32502 709/246 |
| 5,638,504 A | * | 6/1997 | Scott | G06F 9/451 715/202 |

(Continued)

OTHER PUBLICATIONS

Wikipedia, "Symbolic link," http://en.wikipedia.org/wiki/Symbolic_link, accessed Dec. 3, 2014.*

(Continued)

*Primary Examiner* — Patrick McAtee
(74) *Attorney, Agent, or Firm* — Lee Law, PLLC; Christopher B. Lee

(57) ABSTRACT

Provided are techniques for synchronization. In response to an event that modifies a real object at a first content management system, another event is triggered to perform an action to modify a corresponding proxy object at a second content management system. In response to an event that modifies a real object at the second content management system, another event is triggered to perform an action to modify a corresponding proxy object at the first content management system.

18 Claims, 19 Drawing Sheets

(56) References Cited

U.S. PATENT DOCUMENTS

| | | | |
|---|---|---|---|
| 5,689,706 A * | 11/1997 | Rao et al. | |
| 5,701,462 A * | 12/1997 | Whitney et al. | 709/229 |
| 5,740,368 A | 4/1998 | Villalpando | |
| 5,781,633 A * | 7/1998 | Tribble et al. | 713/167 |
| 5,787,441 A | 7/1998 | Beckhardt | |
| 5,946,685 A * | 8/1999 | Cramer et al. | |
| 5,987,506 A * | 11/1999 | Carter et al. | 709/213 |
| 6,122,633 A * | 9/2000 | Leymann et al. | |
| 6,138,124 A | 10/2000 | Beckhardt | |
| 6,151,639 A * | 11/2000 | Tucker et al. | 719/316 |
| 6,279,046 B1 * | 8/2001 | Armstrong et al. | 710/5 |
| 6,418,447 B1 * | 7/2002 | Frey et al. | |
| 6,502,102 B1 * | 12/2002 | Haswell | G06F 11/3664 |
| 6,571,245 B2 | 5/2003 | Huang et al. | |
| 6,615,253 B1 * | 9/2003 | Bowman-Amuah | G06F 16/9574 709/219 |
| 6,728,877 B2 | 4/2004 | Mackin et al. | |
| 6,728,963 B1 * | 4/2004 | Forin et al. | 719/310 |
| 6,769,022 B1 * | 7/2004 | DeKoning et al. | 709/223 |
| 6,772,159 B1 | 8/2004 | Blount et al. | |
| 6,826,579 B1 | 11/2004 | Leymann et al. | |
| 6,947,940 B2 * | 9/2005 | Anderson et al. | 707/613 |
| 6,978,423 B2 | 12/2005 | Seetharaman et al. | |
| 6,990,478 B2 * | 1/2006 | Loy et al. | 707/781 |
| 7,055,147 B2 * | 5/2006 | Iterum et al. | 717/170 |
| 7,079,044 B1 * | 7/2006 | Stanfield | G06F 17/30011 340/539.13 |
| 7,236,975 B2 | 6/2007 | McCauley et al. | |
| 7,281,019 B2 | 10/2007 | Taketa et al. | |
| 7,295,120 B2 * | 11/2007 | Waldner | G06K 7/00 235/385 |
| 7,418,439 B2 * | 8/2008 | Wong | |
| 7,426,548 B2 | 9/2008 | Griffin et al. | |
| 7,433,896 B2 | 10/2008 | Owen et al. | |
| 7,496,687 B2 | 2/2009 | Griffin et al. | |
| 7,516,167 B2 | 4/2009 | Selman et al. | |
| 7,552,223 B1 * | 6/2009 | Ackaouy et al. | 709/229 |
| 7,574,488 B2 * | 8/2009 | Matsubara | 709/219 |
| 7,593,888 B2 | 9/2009 | Block et al. | |
| 7,617,240 B2 | 11/2009 | Guyan et al. | |
| 7,631,296 B2 * | 12/2009 | Seshadri et al. | 717/117 |
| 7,702,744 B2 | 4/2010 | Hoshiai et al. | |
| 7,840,614 B2 | 11/2010 | Owen et al. | |
| 7,913,105 B1 * | 3/2011 | Ganesh et al. | 709/224 |
| 7,917,537 B2 | 3/2011 | McVeigh et al. | |
| 7,953,734 B2 | 5/2011 | McVeigh et al. | |
| 7,971,144 B2 | 6/2011 | Paul et al. | |
| 8,099,779 B2 | 1/2012 | Owen et al. | |
| 8,200,700 B2 | 6/2012 | Moore et al. | |
| 8,296,338 B2 | 10/2012 | Caso et al. | |
| 8,661,154 B2 * | 2/2014 | Farver | G06F 8/71 709/234 |
| 2002/0098840 A1 * | 7/2002 | Hanson et al. | 455/435 |
| 2002/0152210 A1 * | 10/2002 | Johnson et al. | 707/9 |
| 2002/0178271 A1 * | 11/2002 | Graham | G06F 21/6245 709/229 |
| 2003/0023473 A1 * | 1/2003 | Guyan et al. | 705/9 |
| 2003/0167358 A1 * | 9/2003 | Marvin et al. | 709/328 |
| 2004/0167981 A1 | 8/2004 | Douglas et al. | |
| 2004/0255048 A1 * | 12/2004 | Lev Ran | G06F 9/546 709/249 |
| 2005/0060281 A1 * | 3/2005 | Bucher et al. | 707/1 |
| 2005/0060337 A1 * | 3/2005 | Chou et al. | 707/102 |
| 2005/0086384 A1 * | 4/2005 | Ernst | 709/248 |
| 2006/0085412 A1 * | 4/2006 | Johnson et al. | 707/4 |
| 2006/0122955 A1 | 6/2006 | Bethlehem et al. | |
| 2007/0174428 A1 * | 7/2007 | Lev Ran et al. | 709/218 |
| 2008/0033969 A1 | 2/2008 | Koo et al. | |
| 2008/0040397 A1 * | 2/2008 | Herbeck et al. | 707/201 |
| 2008/0046471 A1 * | 2/2008 | Moore et al. | 707/104.1 |
| 2008/0148234 A1 | 6/2008 | Clemm et al. | |
| 2009/0089078 A1 * | 4/2009 | Bursey | 705/1 |
| 2009/0157508 A1 * | 6/2009 | Illingworth et al. | 705/14 |
| 2009/0158292 A1 * | 6/2009 | Rattner et al. | 718/106 |
| 2009/0171897 A1 | 7/2009 | Spinola et al. | |
| 2010/0121816 A1 | 5/2010 | Petri | |
| 2011/0041140 A1 * | 2/2011 | Harm | G06F 9/4843 719/318 |
| 2011/0320494 A1 | 12/2011 | Fisher et al. | |
| 2011/0320504 A1 * | 12/2011 | Marin | 707/805 |
| 2012/0023129 A1 | 1/2012 | Vedula et al. | |
| 2012/0084267 A1 | 4/2012 | Tulkoff et al. | |

OTHER PUBLICATIONS

IBM Federated Content Management, ibm.com/redbooks, available at http://www.redbooks.ibm.com/redbooks/pdfs/sg247742.pdf, Apr. 2010 (accessed Jan. 9, 2019).*

IBM Knoweldge Center, "Types of remote procedure call," available at https://www.ibm.com/support/knowledgecenter/SSGMCP_5.3.0/com.ibm.cics.ts.doc/dfhtm/topics/dfhtmc00195.html (accessed Feb. 7, 2019).*

IBM Redbook, "Getting Started on Integrating Your Information," 2003, available at http://www.redbooks.ibm.com/redbooks/pdfs/sg246892.pdf (accessed Feb. 7, 2019).*

Versace, Michael, "What Is Federated Records Management," available at https://wikibon.org/wiki/v/What_is_Federated_Records_Management, Apr. 12, 2010 (accessed Jan. 9, 2019).*

Oracle, "Asynchronous and Synchronous Remote Procedure Call Communication," 2010, available at https://docs.oracle.com/cd/E19048-01/chorus5/806-6897/architecture-109/index.html (accessed Feb. 7, 2019).*

Mell, P. and T. Grance, "Effectively and Securely Using the Cloud Computing Paradigm", [online], Oct. 7, 2009, retrieved from the Internet at <URL: http://csrc.nist.gov/groups/SNS/cloud-computing/cloud-computing-v26.ppt>, Total 80 pp.

Mell, P. and T. Grance, "The NIST Definition of Cloud Computing (Draft)", Jan. 2011, Computer Security Division Information Technology Laboratory National Institute of Standards and Technology, Total 7 pp.

United States Patent and Trademark Office, Examiner's Answer for U.S. Appl. No. 14/060,091, Apr. 5, 2016, pp. 1-126, Alexandria, VA, USA.

Anton W. Fetting, et al., Administrative Patent Judges, United States Patent and Trademark Office, Patent Trial and Appeal Board, Decision on Appeal for Appeal No. 2016-006174, U.S. Appl. No. 14/060,091, Jun. 22, 2018, pp. 1-21, Alexandria, VA, USA.

United States Patent and Trademark Office, Office Action for U.S. Appl. No. 14/060,091, dated Sep. 27, 2018, pp. 1-47, Alexandria, VA, USA.

United States Patent and Trademark Office, Office Action for U.S. Appl. No. 13/657,201, dated Sep. 16, 2013, pp. 1-19, Alexandria, VA, USA.

United States Patent and Trademark Office, Office Action for U.S. Appl. No. 13/657,201, dated Jan. 2, 2014, pp. 1-49, Alexandria, VA, USA.

United States Patent and Trademark Office, Notice of Abandonment for U.S. Appl. No. 13/657,201, dated Jul. 28, 2014, pp. 1-2, Alexandria, VA, USA.

F. Robert Jacobs, et al., Enterprise resource planning (ERP)—A brief history, Journal of Operations Management, Dec. 12, 2006, pp. 357-363, vol. 25, Elsevier B.V., published online at: http://www.sciencedirect.com/science/article/pii/S0272696306001355.

Author Unknown, Manufacturing—Moving Towards a Collaborative Supply Chain, Sep. 9, 2010, pp. 1-67, Publisher unknown, published online at: http://theprofessornotes.com/wp-content/uploads/2010/09/Manufacturing-moving-towards-a-collaborative-supply-chain_wiki.pdf.

B. Callaghan, et al., NFS Version 3 Protocol Specification, Jun. 1995, pp. 1-129, Sun Microsystems, Inc., Published online at: http://ietf.org/rfc/rfc1813.txt.

Author Unknown, Framework, Dictionary of Multimedia and Internet Applications: A Guide for Developers and Users, p. 1, Retrieved by USPTO Examiner from website on Jun. 2, 2014, Published online at: http://search.credoreference.com/content/entry/wdmia/framework.

(56) References Cited

OTHER PUBLICATIONS

United States Patent and Trademark Office, Office Action for U.S. Appl. No. 14/060,091, dated Dec. 27, 2013, pp. 1-44, Alexandria, VA, USA.
United States Patent and Trademark Office, Office Action for U.S. Appl. No. 14/060,091, dated Jun. 12, 2014, pp. 1-108, Alexandria, VA, USA.
United States Patent and Trademark Office, Examiner's Answer for U.S. Appl. No. 14/060,091, Mar. 11, 2015, pp. 1-82, Alexandria, VA, USA.
United States Patent and Trademark Office, Office Action for U.S. Appl. No. 14/060,091, dated May 28, 2015, pp. 1-72, Alexandria, VA, USA.

* cited by examiner

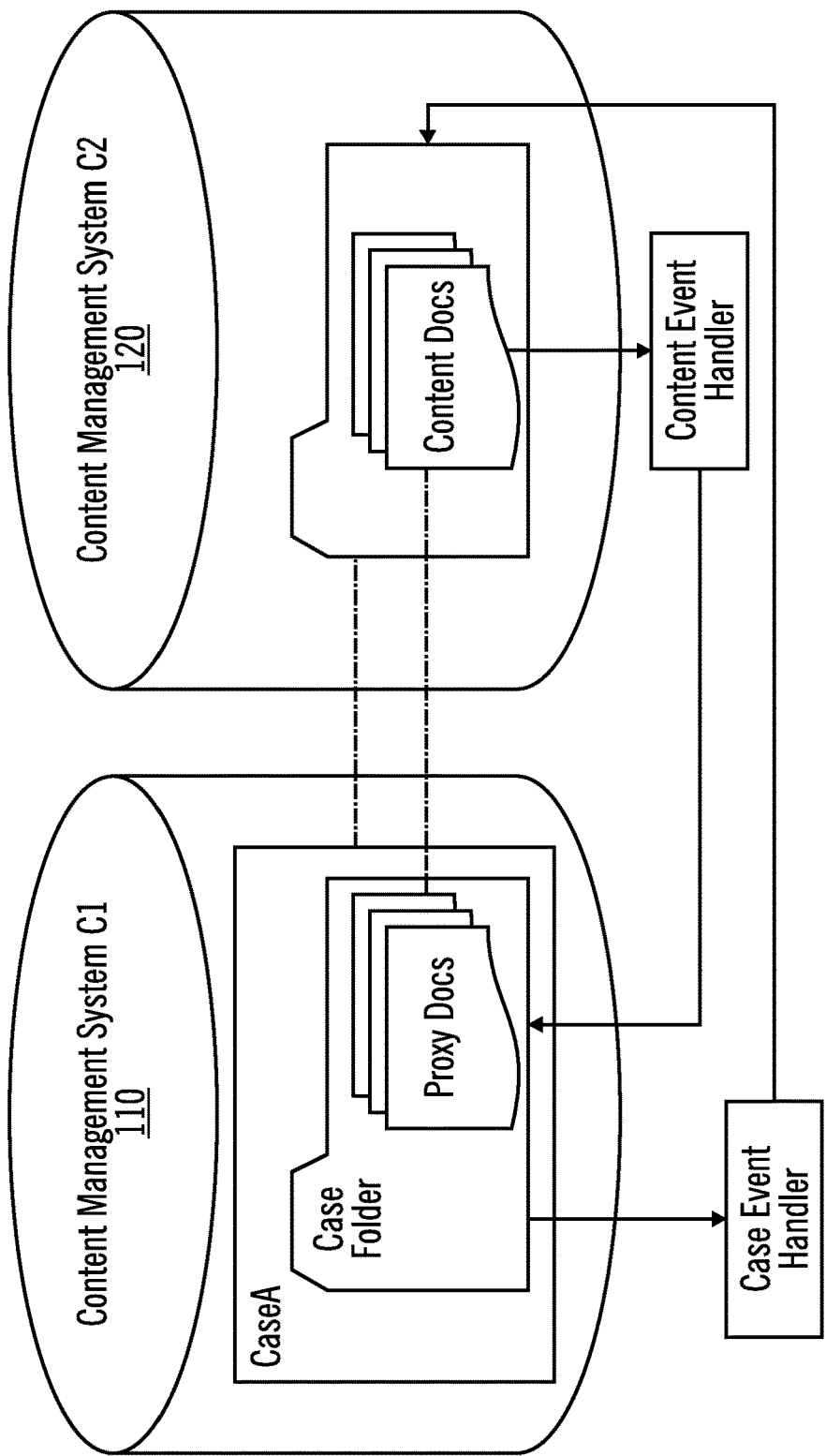

US 10,346,422 B2

USE OF PROXY OBJECTS FOR INTEGRATION BETWEEN A CONTENT MANAGEMENT SYSTEM AND A CASE MANAGEMENT SYSTEM

FIELD

Embodiments of the invention relate to use of proxy objects for integration between a content management system and a case management system.

BACKGROUND

Content management systems manage objects (such as documents, folders, or other types of objects). Content management systems have a catalog database that catalogs the objects that are stored in one or more content stores.

Process management systems manage workflow processes and may use a content management system to store and retrieve objects, as well as, to maintain workflow queues.

A case management system uses both a process management system and a content management system in order to facilitate the processing of cases (e.g., automobile insurance claims) by human case workers. A case may be described as a matter requiring investigation, decision, and resolution. In a case management system, a process management system implements the behavioral aspects of processing cases, and a content management system implements the informational aspects of processing cases.

For example, assume there is an existing case management system M that uses C1 as its content management system and P as its process management system. It may be desirable to integrate a different heterogeneous content management system C2 with M, such that M will use C2 instead of C1 for the case documents and folders. M will continue to use P as the process management system and will continue to use C1, but only for the catalog database objects related to the behavioral aspects of the case.

Some systems may integrate C2 with M with a bi-directional catalog synchronization of the informational parts of the catalogs of C1 and C2. In bi-directional catalog synchronization, the catalogs of two heterogeneous content management systems are automatically kept in sync by enhancements made to both of them. Keeping the two catalogs in sync includes mapping the document class and property definitions of the two catalogs to each other; addressing the continued system operation without losing synchronization information if one catalog crashes but not the other; continued system operation without losing synchronization information if the network is temporarily partitioned; "priming the pump" (i.e., which means not only keeping new objects added to either catalog in sync with the twin object in the other catalog going forward, but also creating mirror twin copies of catalog entries in one catalog from potentially millions of pre-existing catalog entries in the other catalog in a controllable and restartable way); keeping the catalogs in sync when nearly simultaneous updates are made to both members of a pair of twin catalog entries, so that the changes cross "in flight" over the network; performing the creates, deletes, and updates made to each object in both catalogs in ascending time order, etc.

Some systems use integration technology that uses content federation services where the real objects are replicated from the content management server to the case management server.

SUMMARY

Provided are a method, computer program product, and system for synchronization. In response to an event that modifies a real object at a first content management system, another event is triggered to perform an action to modify a corresponding proxy object at a second content management system. In response to an event that modifies a real object at the second content management system, another event is triggered to perform an action to modify a corresponding proxy object at the first content management system.

BRIEF DESCRIPTION OF THE SEVERAL VIEWS OF THE DRAWINGS

Referring now to the drawings in which like reference numbers represent corresponding parts throughout:

FIGS. 4A, 4B, and 4C illustrate, in block diagrams, an example of creating a new case instance as a side effect of creating a document in accordance with certain embodiments.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
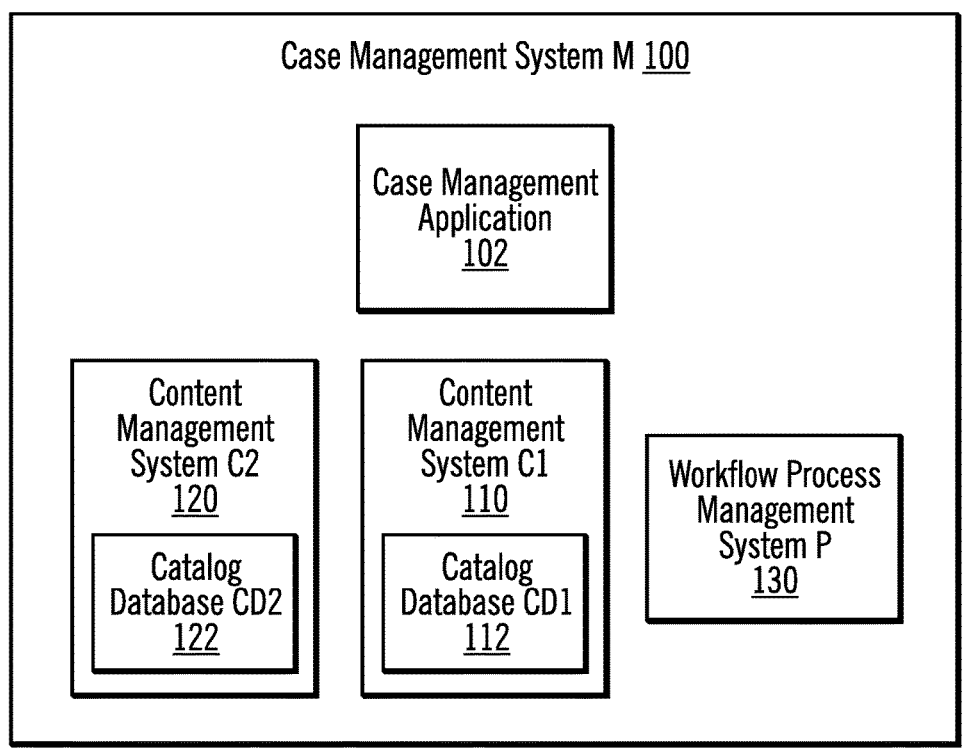
FIG. 1 illustrates, in a block diagram, a case management system in accordance with certain embodiments.

FIG. 1 illustrates, in a block diagram, a case management system 100 in accordance with certain embodiments. The case management system 100 includes a case management application 102, a content management system C1 110, a content management system C2 120, and a workflow process management system 130. The content management system C1 110 is one that the case management system 100 was using before the content management system C2 120 was added. The content management system C1 110 includes a catalog database DB1 112. The content management system C2 120 includes a catalog database DB2 122. With embodiments, the newly added content management system C2 120 controls the informational aspects, and the previously existing content management system C1 110 controls the behavioral aspects.

In certain embodiments, the content management system C1 110, the content management system C2 120, and the workflow process management system 130 are on separate computing devices and may use the same or separate database instances.

Figure 2:
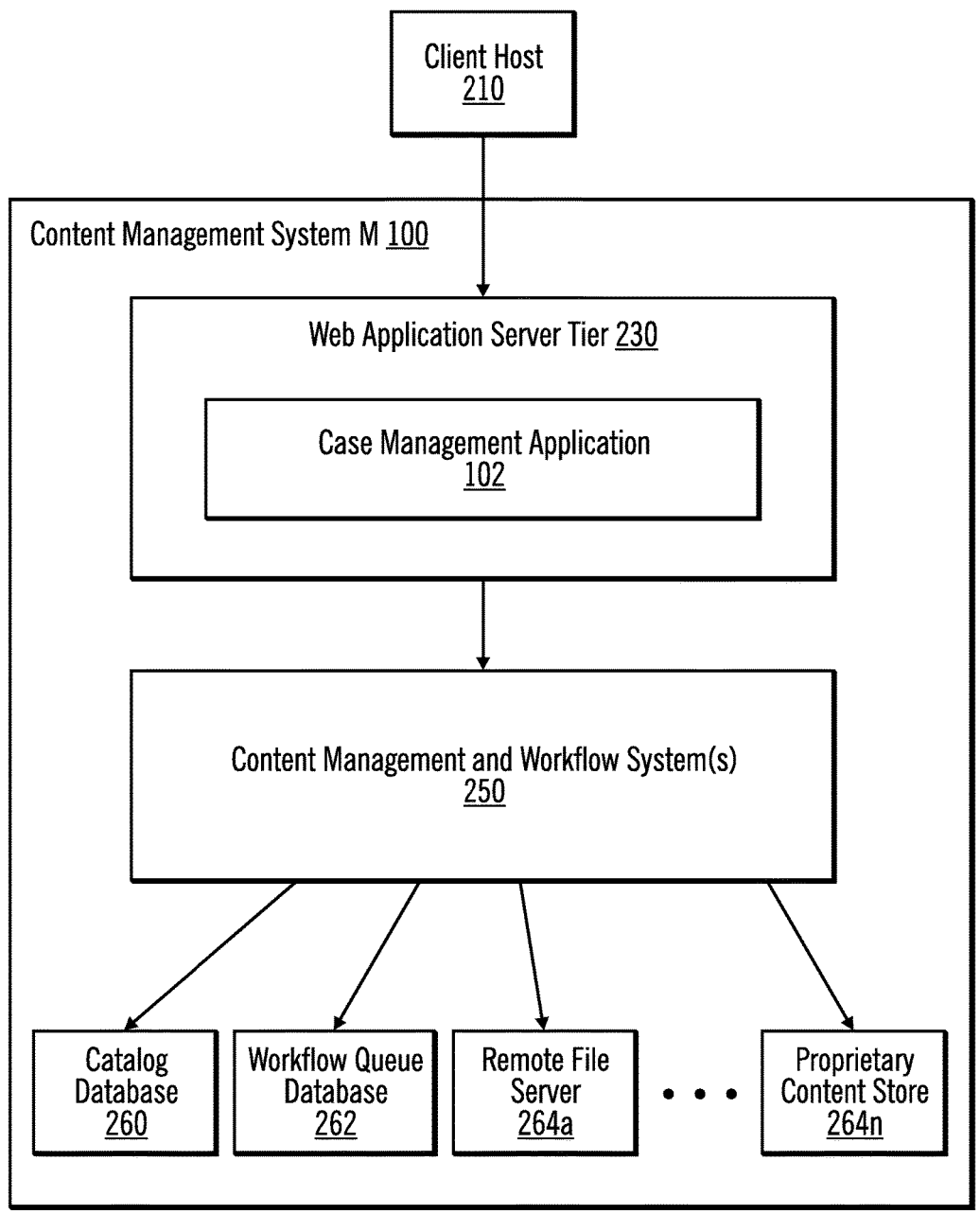
FIG. 2 illustrates, in a block diagram, further details of a case management system in accordance with certain embodiments.

FIG. 2 illustrates, in a block diagram, further details of a case management system M 100 in accordance with certain embodiments. In FIG. 2, a client host 210 is coupled to a web application server tier 230. In certain embodiments, the client host 210 is browser based or is a "thick" client application. In certain embodiments, the client host 210 is a computing device, such as a laptop, tablet computer, etc.

The web application server tier 230 includes a case management application 102. In certain embodiments, the web application server tier 230 may be farmed. The web application server tier 230 is coupled to content management and workflow system(s) 250. The content management and workflow system(s) 250 may include, for example, the content management system C1 110, the content management system C2 120, and the workflow process management system 130. In certain embodiments, the content management and workflow system(s) 250 may be farmed. In certain embodiments, the content management and workflow system(s) 250 may be a content management and workflow software combined into one indivisible system. In certain alternative embodiments, the content management and workflow system(s) 250 may have a separate content management system and a separate workflow system.

The content management and workflow system(s) 250 are coupled to data stores, such as a catalog database 260, a workflow queue database 262, and one or more pluggable fixed content stores 264a . . . 264n to store object content. In certain embodiments, the catalog database 260 is a remote database server that holds object properties (e.g., title, account number, etc.). In certain embodiments, the remote database server 260 may be clustered. In various embodiments, the catalog database 260 and the workflow queue database 162 may be combined into one database or may be separate databases.

In order to accomplish the integration of the new content management system C2 120 with a case management system 100, embodiments use proxy objects for the informational objects (e.g., case documents and folders), but not for the behavioral objects (e.g., workflow queues, etc.) of case management.

Proxy objects are used in one content management system 110, 120 to represent and to mirror the real objects in the other content management system 110, 120.

In certain embodiments, each proxy object has a special attribute that represents a global identification that is the external reference to the real object so that applications can access the real object via this external reference. These proxy objects are controlled by an event infrastructure in both content management systems 110, 120. Event handlers in both content management systems 110, 120 create, update, and delete these proxy objects. Thus, the proxy objects act like real objects without copying metadata.

In certain embodiments, the proxy objects are used so that the informational folder sub-hierarchy of a case instance in the newly added content management system C2 120 is mirrored in the existing content management system C1 110. The event handlers of the content management systems C1 110 and C2 120, in conjunction with synchronous Remote Procedure Calls (RPCs), are used to keep the two folder sub-hierarchies isomorphic. That enables the workflow process management system P 130 to operate the same or similarly as before the integration. The case document creation, retrieval, updates, and deletions are done in the content management system C2 120 through current, existing content management interfaces (e.g., APIs, web services, etc.). That leverages the existing capabilities of the workflow process management system P 130 and the content management system C2 120 for optimal query performance.

In certain embodiments, when an RPC is made, a client application executing on the client host 210 calls an API that causes processing to be performed on the case management host (i.e., web application server tier 230)

After the integration of the content management system C2 120 with the case management system 100, the case management system 100 uses two catalog databases: the catalog database CD1 112 of content management system C1 110 and the catalog database CD2 122 of content management system C2 120. A "real" (informational) object in one catalog database 112 or 122 (of content management system C1 110 or content management system C2 120) has the properties of the real object, and the twin informational object in the other catalog database 112 or 122 (of content management system C2 120 or content management system C1 110) is called a "proxy" object. The proxy object does not have the real object's properties. Thus, the real properties exist with the real object. The real object references the proxy object and vice versa. Proxy objects are used to mirror the structure of the case document and folder hierarchy of the catalog database CD2 122 in the catalog database CD1 112 (i.e., to make them isomorphic).

The mirroring of the case document and folder hierarchy may be accomplished by using the event handlers of the content management system C2 120 and the content management system C 110. Event handlers may be triggered that call synchronous RPCs to make the corresponding changes to the other catalog database 112, 122.

The case documents and folders in the catalog database CD2 122 are real objects, except for the root case instance folders, which are proxy objects. Thus, document creation, deletion, retrieval, and folder browsing operations are done in the catalog database CD2 122, making the content management system C2 120 the sole repository of case documents.

The real objects in the catalog database CD1 112 are the root case instance folders themselves. The root case instance folders are real in the content management system C1 110 so that the workflow process management system 130 can operate similarly to the way it did before the integration. A root case instance folder in the content management system C1 110 is mirrored by a proxy case folder object in the content management system C2 120. The proxy root case instance folders are the only proxy objects in the content management system C2 120.

Figure 3:
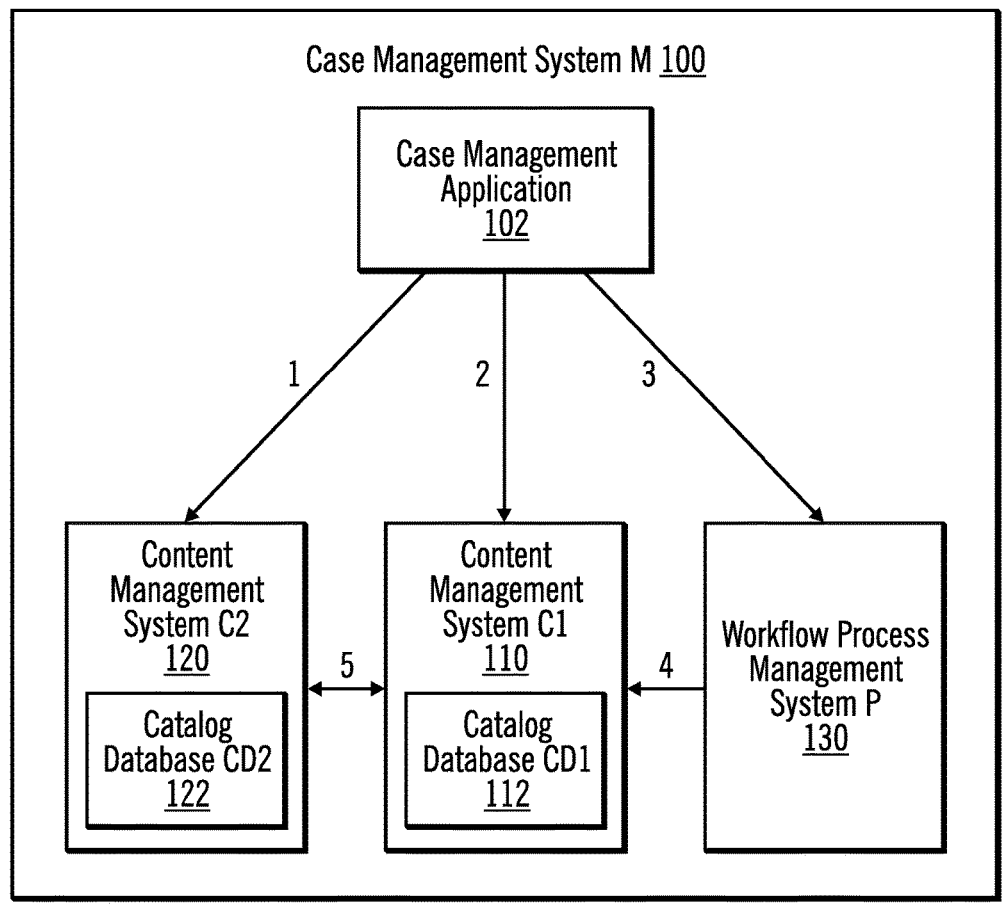
FIG. 3 illustrates, in a block diagram, processing flow in a case management system in accordance with certain embodiments.

FIG. 3 illustrates, in a block diagram, processing flow in a case management system 100 in accordance with certain embodiments. In certain embodiments, the client host is outside of the case management system 100, and cases may be worked on by case workers via a user interface (e.g., a browser on the client host), and no case management application needs be installed on the client host. In certain embodiments, the case management application 102 understands (e.g., has hard coded knowledge of) when to call the content management system C1 110, the content management system C2 120, and the workflow process management system 130 based on what operation is to be performed. The following five numbered points below refer to the numbered arrows in FIG. 3.

(1) The case management application 102 calls the content management system C2 122 via one a content management API to create, update (version), or delete documents and folders for the information part of a case, to file or unfile documents and/or folders from folders in the informational part of the case, and to query for documents and folders in the informational part of the case. Unfiling a document refers to removing that document from a folder.

(2) The case management application 102 calls the content management system C1 110 to retrieve the properties of the root folder of a case instance in order to present the entire case instance folder sub-hierarchy as if it were contained completely in the content management system C2 120. This is done because the root folder of a case instance is real in the content management system C1 110 and a proxy in the content management system C2 120. The rest of the documents and folders are real in the content management system C2 120 and proxies in the content management system C1 110.)

(3) The case management application 102 calls the workflow process management system 130 to look at workflow inboxes, to select a task to work on, to see lists of workflow tasks, to see task status, to launch tasks, etc.

(4) The workflow process management system 130 uses the content management system C1 110 to maintain work queues.

(5) The two content management systems C1 110 and C2 120 are maintained as mirror images. That is accomplished by an event handler firing in either content management system C1 110 or C2 120 when a relevant event occurs, and such an event handler performs synchronous RPCs to the other content management system 110, 120 to keep the two informational sub-hierarchies isomorphic.

Figure 4A:
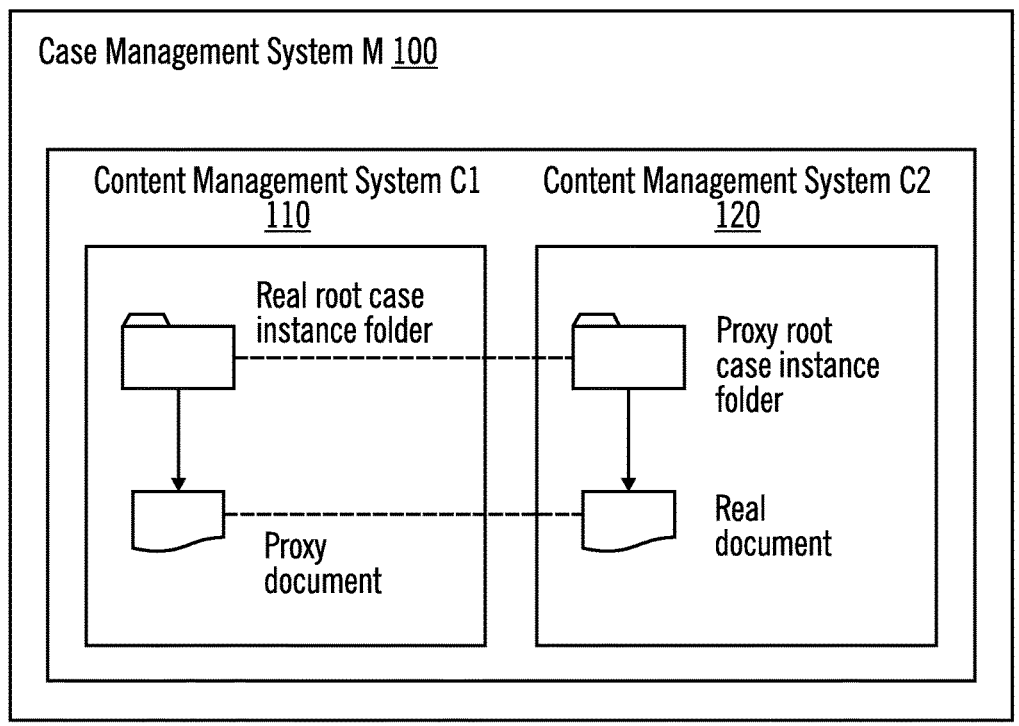

FIGS. 4A and 4B illustrate, in a block diagram, an example of creating a new case instance as a side effect of creating a document in accordance with certain embodiments. In some case management systems, it is possible to specify a list of document classes, such that creating a document in any one of those document classes automatically creates a new case instance as a side effect, and referentially files the new document in the newly created root case instance folder. In certain case management systems, the case folder is created manually, and then the new document is filed into the created case folder.

Figure 4C:
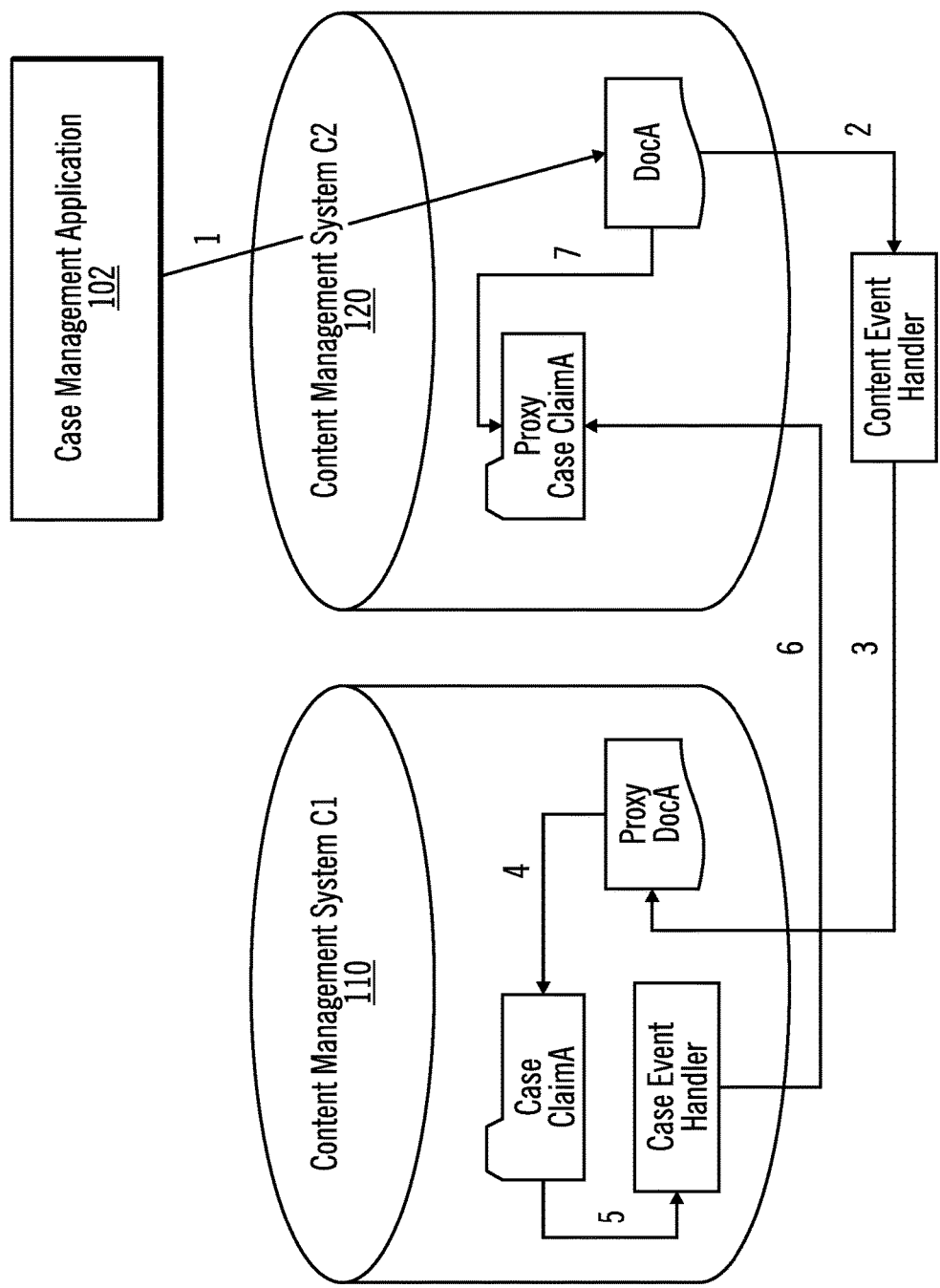

In FIG. 4C, creating a document is an informational aspect, so that happens in the content management system C2 120 via a document creation API call (operation 1).

An event handler in the content management system C2 120 is triggered by the creation of such a document in the content management system C2 120 (operation 2). The event handler performs an RPC to the content management system C1 110. That RPC creates a proxy document in the content management system C1 110 for the new document in the content management system C2 120 (operation 3).

Creating the new proxy document in the content management system C1 110 triggers an event handler in the content management system C1 110 that automatically creates a new real root case instance folder and files the new proxy document under that real root case instance folder (operation 4 and 5).

That event handler then performs an RPC to the content management system C2 120 to create a root proxy case instance folder in the content management system C2 120 (operation 6) and files the new document originally created in the content management system C2 120 under the root proxy case instance folder (operation 7).

At that point, the two case instance folder sub-hierarchies are isomorphic, as illustrated in FIG. 4A.

Figure 5A:
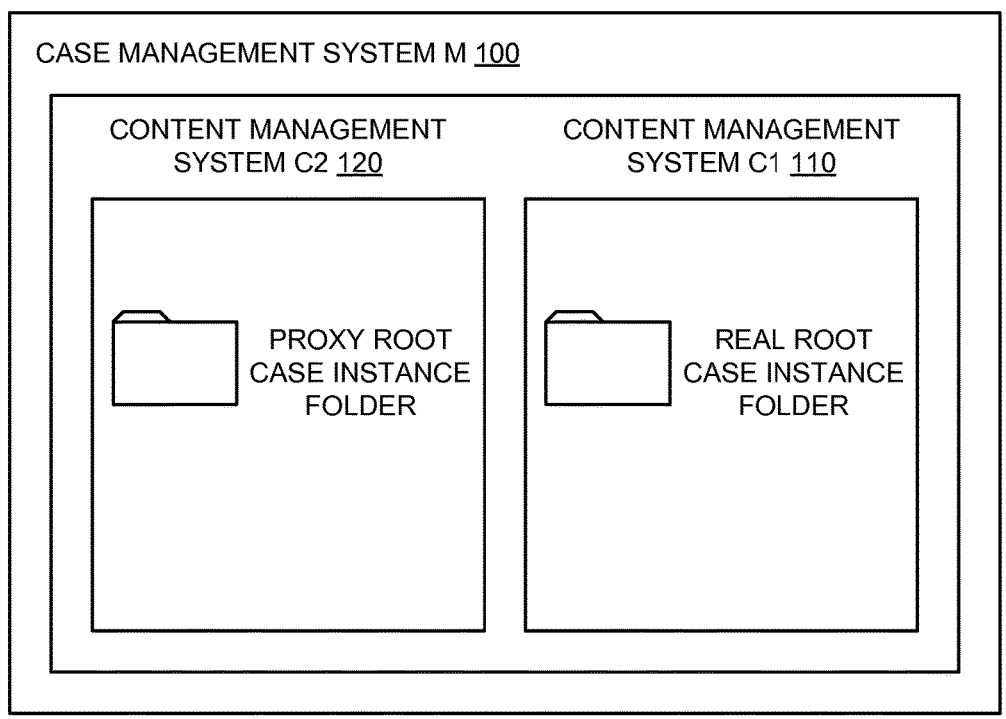
FIGS. 5A and 5B illustrate, in block diagrams, an example of creating a case folder manually in accordance with certain embodiments.
Figure 5B:
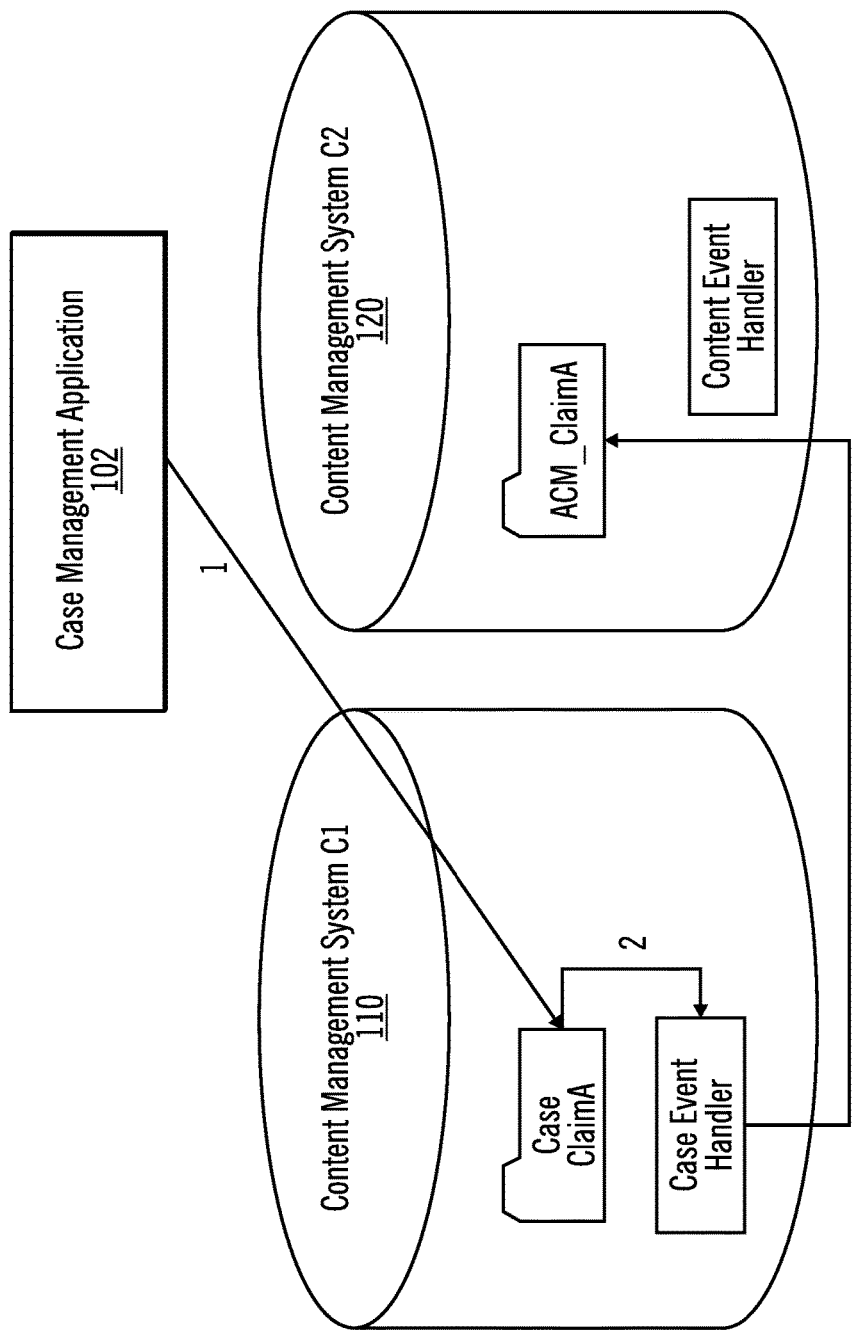

FIGS. 5A and 5B illustrate, in block diagrams, an example of creating a case folder manually in accordance with certain embodiments. The case management application 102 has knowledge of which content management system 110, 120 to call for any particular operation. In this case, the case management application 102 calls the content management system C1 110 because the root case instance folder is in the content management system C1 110. So the case management application 102 uses an API to call the content management system C1 110 to create a root case instance folder.

That triggers an event handler in the content management system C1 110 that calls an RPC to create the corresponding proxy case folder in the content management system C2 120. At that point, the two case instance folder sub-hierarchies are isomorphic as illustrated in FIG. 5A.

Figure 6:
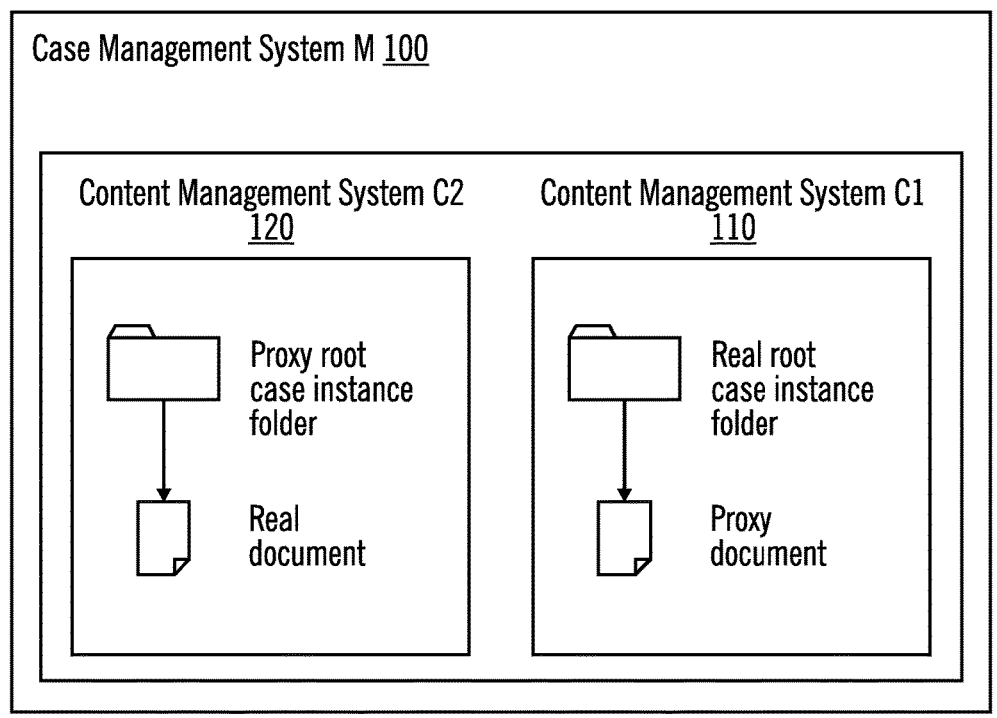
FIG. 6 illustrates, in a block diagram, an example of a preexisting document that is filed under a root case instance folder in accordance with certain embodiments.

FIG. 6 illustrates, in a block diagram, an example of a preexisting document that is filed under a root case instance folder in accordance with certain embodiments. The document filing operation is carried out by the case management application 102 calling an API of the content management system C2 120, since documents and folders (except for the root case instance folder) are real in the content management system C2 120. This triggers an event handler in the content management system C2 120, which makes an RPC to the content management system C1 110. That RPC creates a proxy document for the content management system C2 120 document and files the proxy document under the real case folder in the content management system C1 110. At that point, the two folder sub-hierarchies are isomorphic, as illustrated in FIG. 6.

Figure 7:
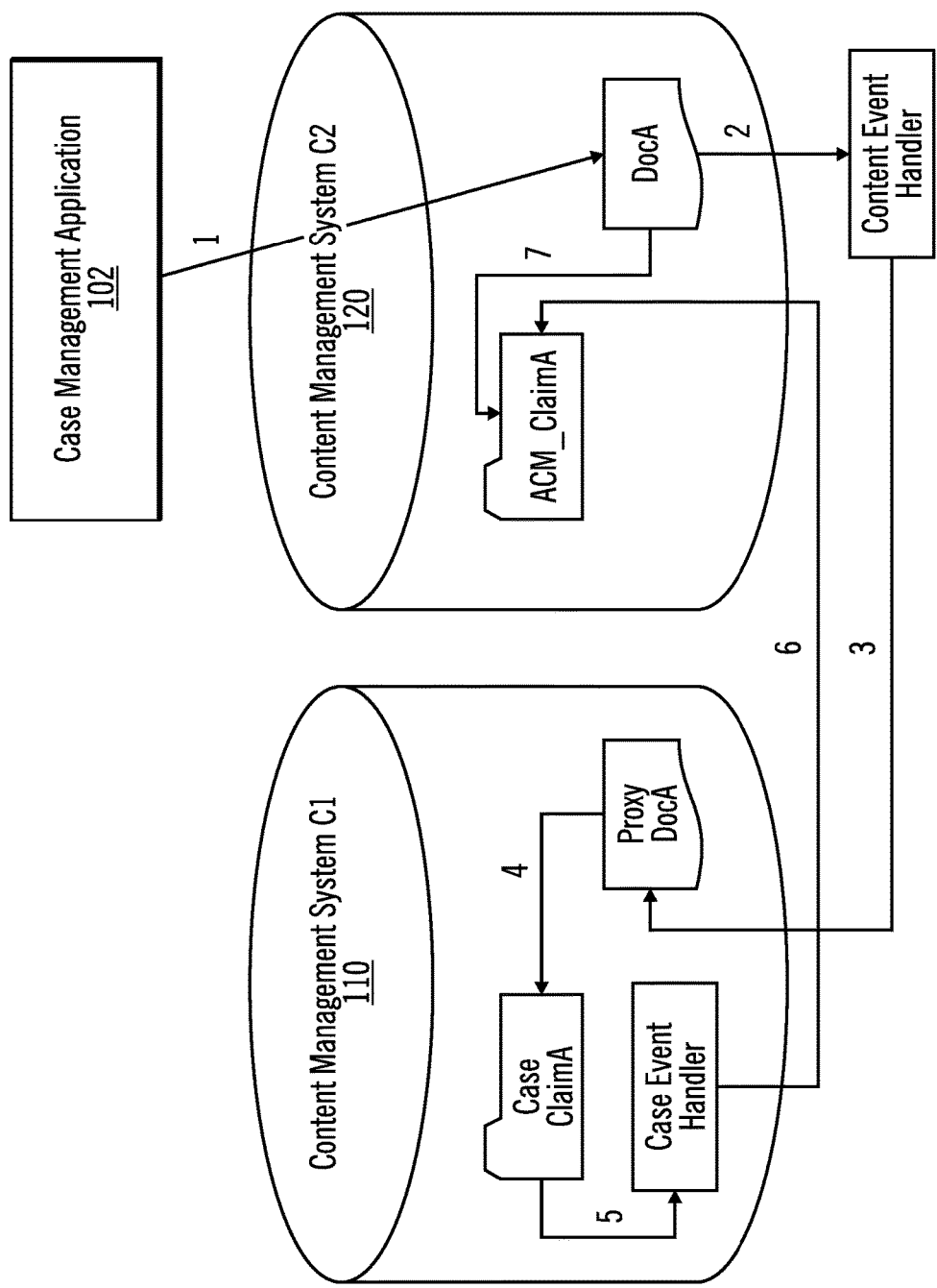
FIG. 7 illustrates, in a block diagram, an example of document creation launching a case in accordance with certain embodiments.

FIG. 7 illustrates, in a block diagram, an example of document creation launching a case in accordance with certain embodiments. In FIG. 7, the case management application 102 creates DocA in the content management system C2 120 (operation 1). The event handler in the content management system C2 120 listens to the "ItemCreate" event (operation 2) and calls an RPC to create a proxy DocA in the content management system C1 110 (operation 3). The creation of the proxy DocA causes the CaseClaimA root case instance folder to be created (operation 4). The event handler in the content management system C1 110 listens to the case folder property change to "working" (operation 5) and calls an RPC to create the proxy ACM_ClaimA folder in the content management system C2 120 (operation 6). The event handler in the content management system C2 120 calls an RPC to file DocA into the ACM_ClaimA folder in the content management system C2 120 (operation 7). The event handler in the content management system C2 120 receives a "FolderAdd" event, but since it checks the ACM_ClaimA folder and finds that DocA is already the original case instance, processing stops.

Figure 8:
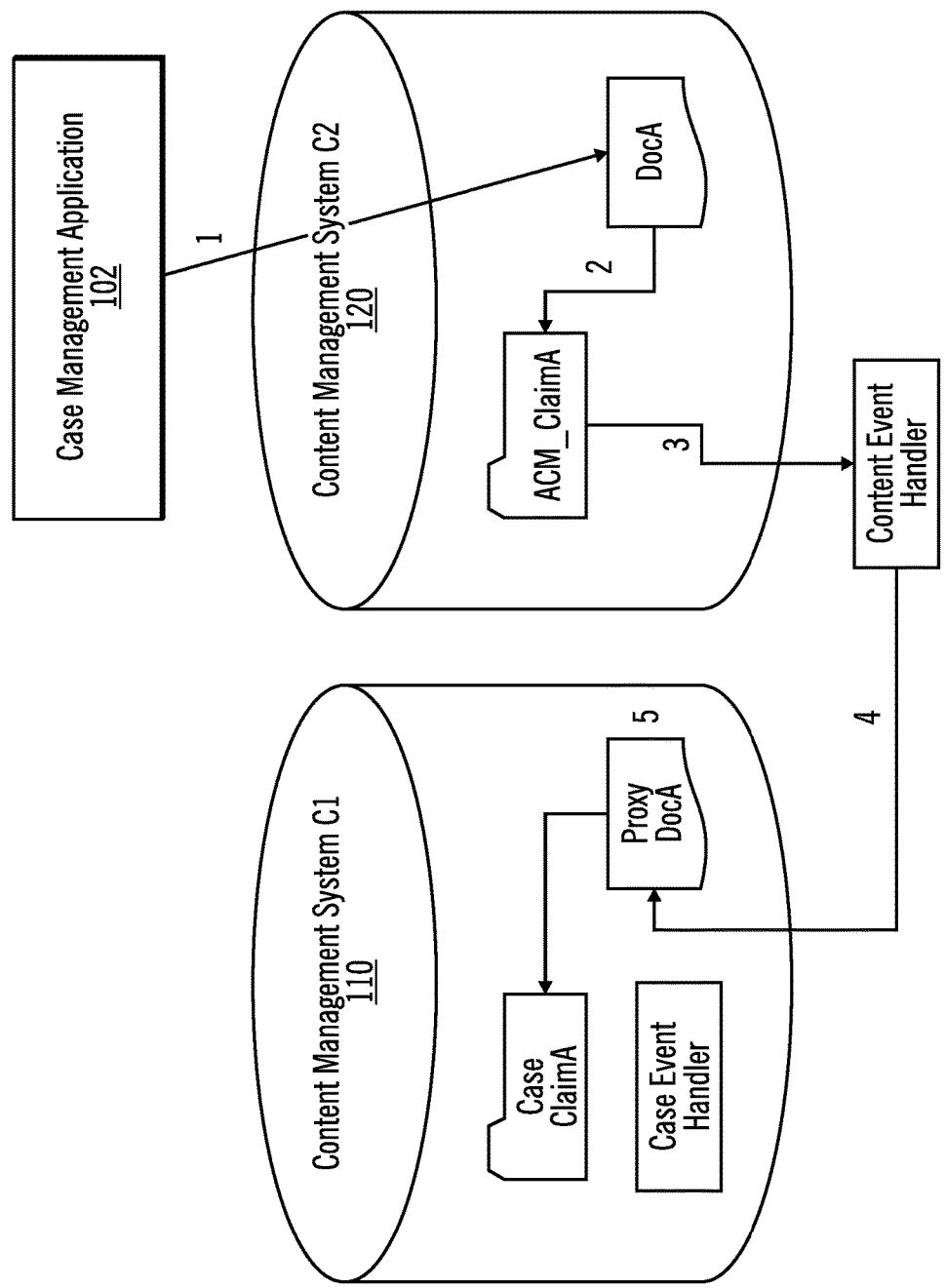
FIG. 8 illustrates, in a block diagram, an example of adding a document to a case instance in accordance with certain embodiments.

FIG. 8 illustrates, in a block diagram, an example of adding a document to a case instance in accordance with certain embodiments. In FIG. 8, the case management application 102 finds DocA as a search result (operation 1). The case management application 102 calls the content management system C2 120 to file DocA to the ACM_ClaimA folder (operation 2). The event handler of the content management system C2 120 listens to the "FolderAdd" event (operation 3) and searches for an existing proxy DocA in the content management system C1 110 (operation 4). If the proxy DocA does not exist, the proxy DocA is created in the content management system C1 110 (operation 4). The event handler in the content management system C2 120 files the proxy DocA to the CaseClaimA root case instance folder in the content management system C1 110.

Figure 9:
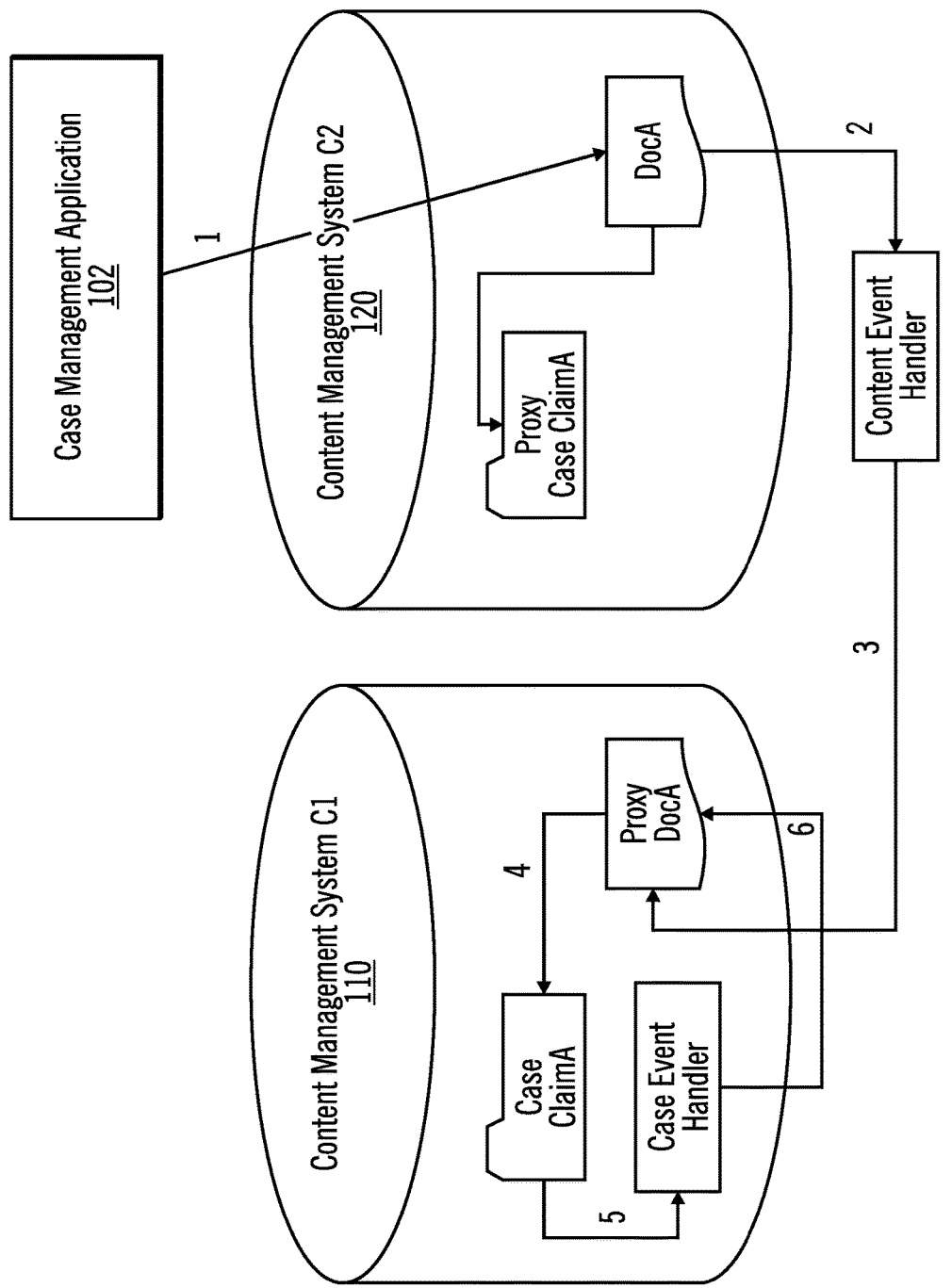
FIG. 9 illustrates, in a block diagram, an example of removing a document from a case instance in accordance with certain embodiments.

FIG. 9 illustrates, in a block diagram, an example of removing a document from a case instance in accordance with certain embodiments. In FIG. 9, the case management application 102 unfiles the real document DocA from the ACM_ClaimA proxy folder in the content management system C2 120 (operation 1). That unfiling operation causes the event handler of system C2 to fire (operation 2). The event handler of the content management system C2 120 listens to the "FolderRemove" event (operation 3) and unfiles the proxy DocA from the CaseClaimA root case instance folder in the content management system C1 110 (operation 4). The event handler of system C1 fires when the proxy DocA is removed from CaseClaimA (operation 5). If the proxy DocA is not filed in other cases, the proxy DocA is deleted by the event handler (operation 6).

Figure 10:
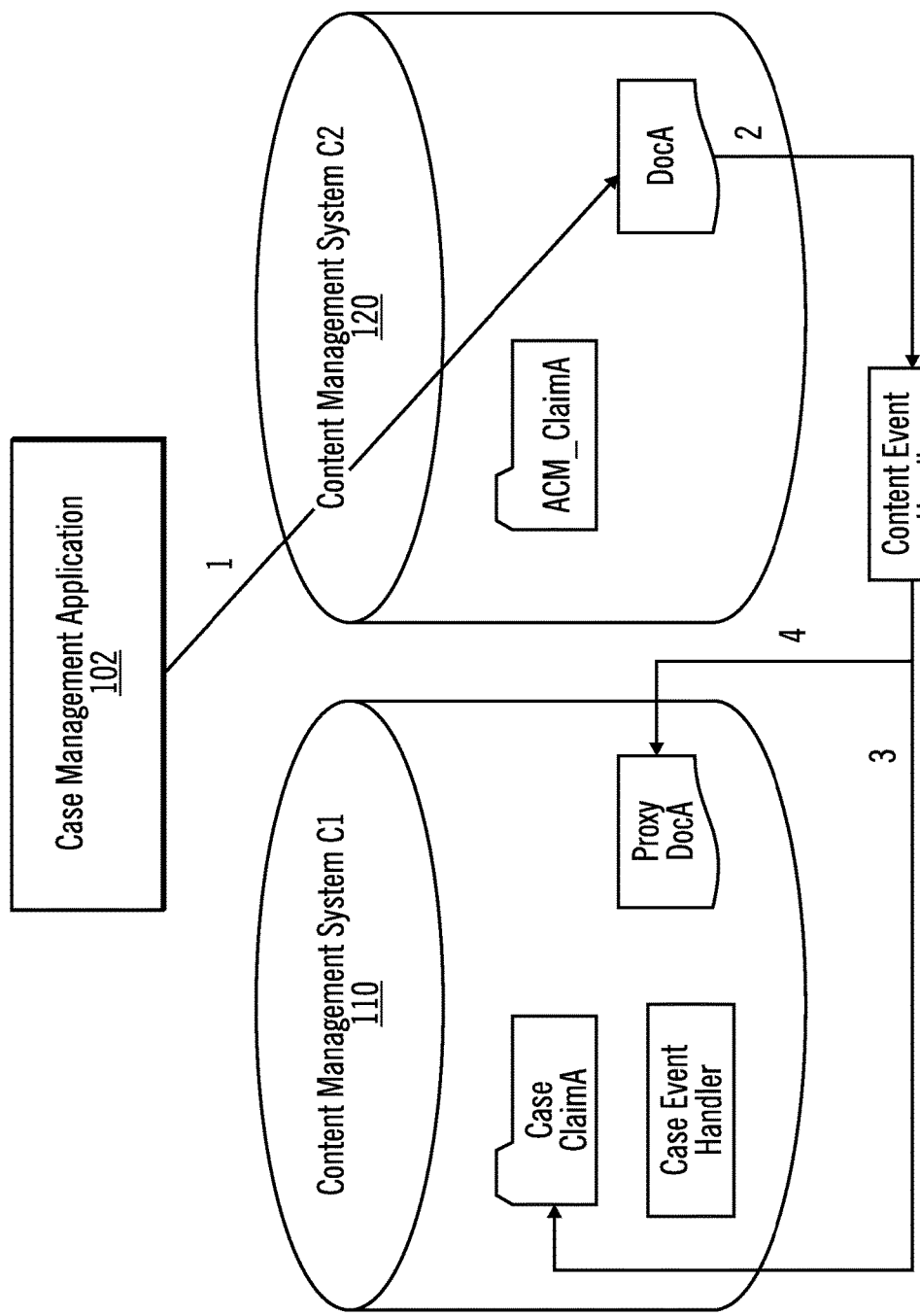
FIG. 10 illustrates, in a block diagram, an example of document deletion in accordance with certain embodiments.

FIG. 10 illustrates, in a block diagram, an example of document deletion in accordance with certain embodiments. In FIG. 10, the case management application 102 deletes DocA from the content management system C2 120 (operation 1). The event handler of the content management system C2 120 listens to the "ItemDelete" event (operation 2) and calls the content management system C1 110 to unfile proxy DocA from the CaseClaimA root case instance folder (operation 3). The event handler of the content management system C2 120 calls the content management system C1 110 to delete proxy DocA (operation 4).

Figure 11:
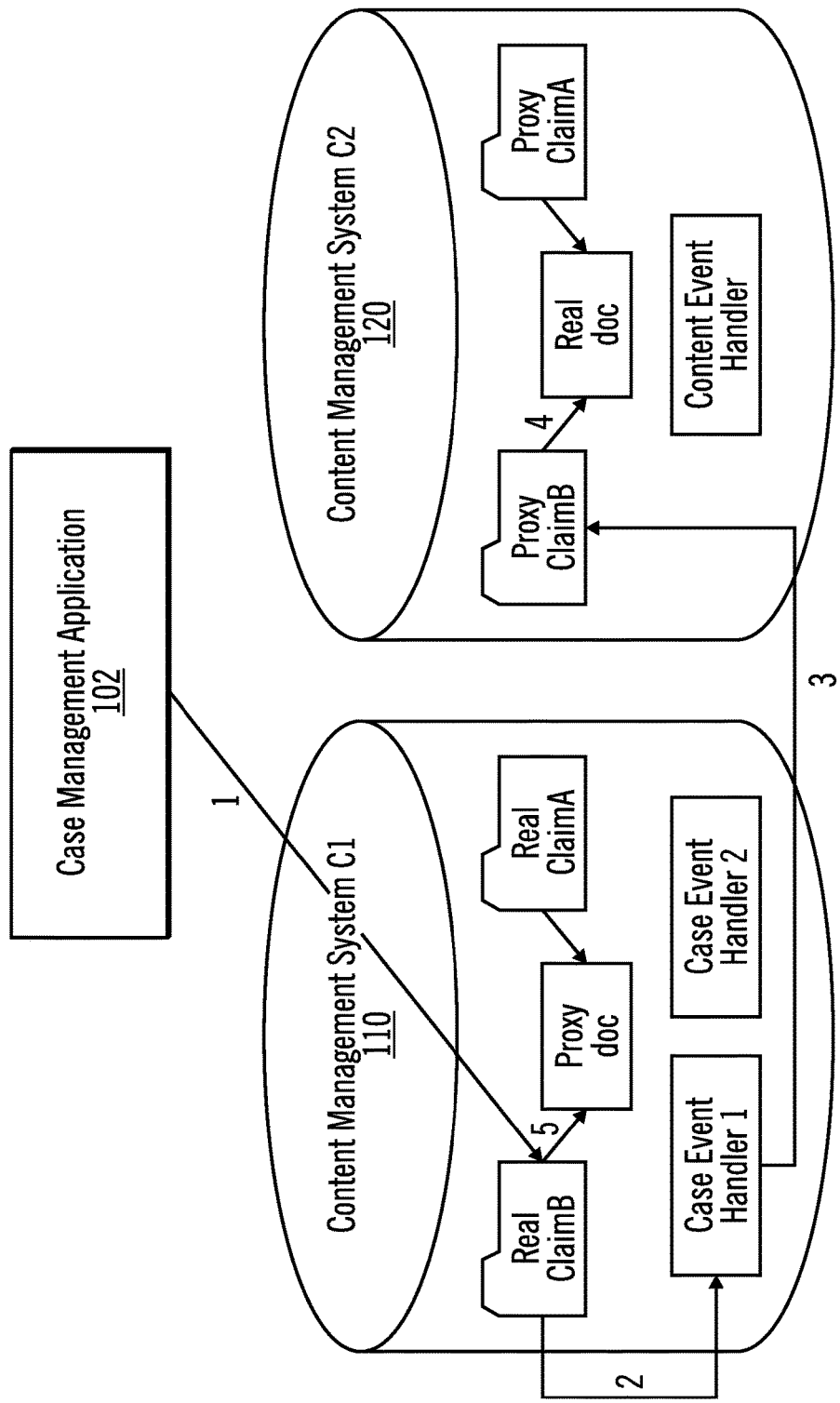
FIG. 11 illustrates, in a block diagram, an example of splitting a case in accordance with certain embodiments.

FIG. 11 illustrates, in a block diagram, an example of splitting a case in accordance with certain embodiments. In the example of FIG. 11, a case worker decides to split a case. In this example, the ClaimA folder exists with documents filed into the ClaimA folder. The case management application 102 calls the content management system C1 110 to create a new case instance ClaimB folder and files a subset of documents from the ClaimA folder into the ClaimB folder (operation 1). The event handler 1 of the content management system C1 110 listens to the property change event "case_state changed to initializing" (operation 2) and calls the content management system C2 120 to create the ClaimB proxy folder (operation 3). The event handler 2 of the content management system C1 110 listens to the property change event "PID property of ClaimB folder becomes non null" and files specified list of documents in the proxy ClaimA folder into the proxy ClaimB folder on the content management system C2 120 (operation 4).

In embodiments, other update operations (e.g., unfiling documents, deleting folders, versioning documents, etc.) on the informational part may be carried out to keep the two sub-hierarchies in sync (i.e., isomorphic) using event handlers and RPCs.

Querying for documents and folders and browsing the informational folder hierarchy for a case are performed by the case management application 102 calling the content management system C2 120 API, with the sole exception that the real case folder is retrieved from the content management system C1 110 when needed by calling the content management system C1 110 API. That gives optimal query performance and the folder browsing performance because all the real documents and folders reside in the content management system C2 120 (with the sole exception of the root case instance folder).

Figure 12:
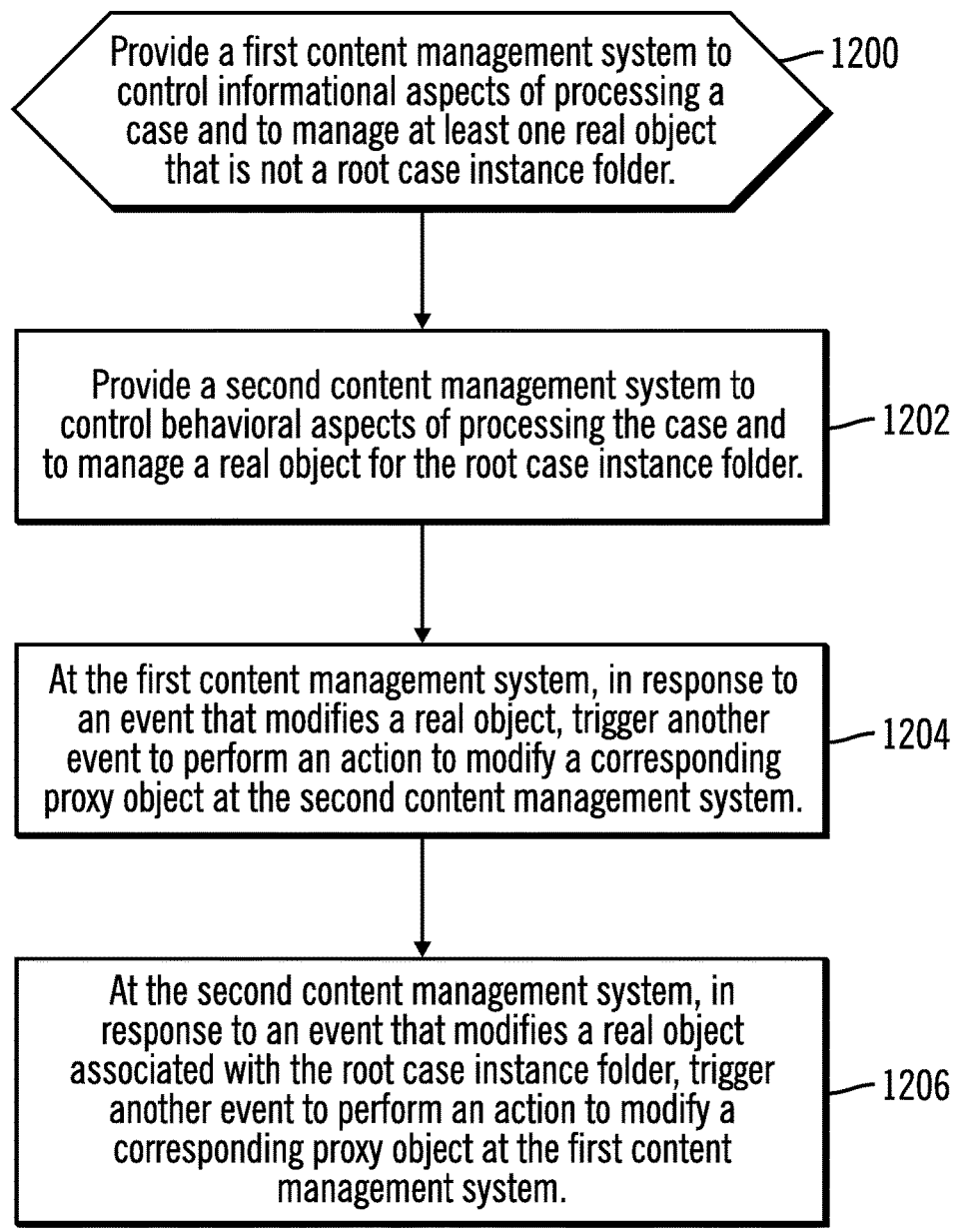
FIG. 12 illustrates, in a flow diagram, operations for synchronization between content management servers in accordance with certain embodiments.

FIG. 12 illustrates, in a flow diagram, operations for synchronization between content management servers in accordance with certain embodiments. Control begins at block 1200 with a first content management system being provided to control informational aspects of processing a case and to manage at least one real object that is not a root case instance folder. In block 1202, a second content management system is provided to control behavioral aspects of processing the case and to manage a real object for the root case instance folder. In block 1204, at the first content management system, in response to an event that modifies (e.g., creates, updates or deletes) a real object, another event is triggered to perform an action to modify (e.g., create, update, delete etc.) a corresponding proxy object at the second content management system. At the second content management system, in response to an event that modifies a real object associated with the root case instance folder, another event is triggered to perform an action to modify a corresponding proxy object at the first content management system.

Figure 13:
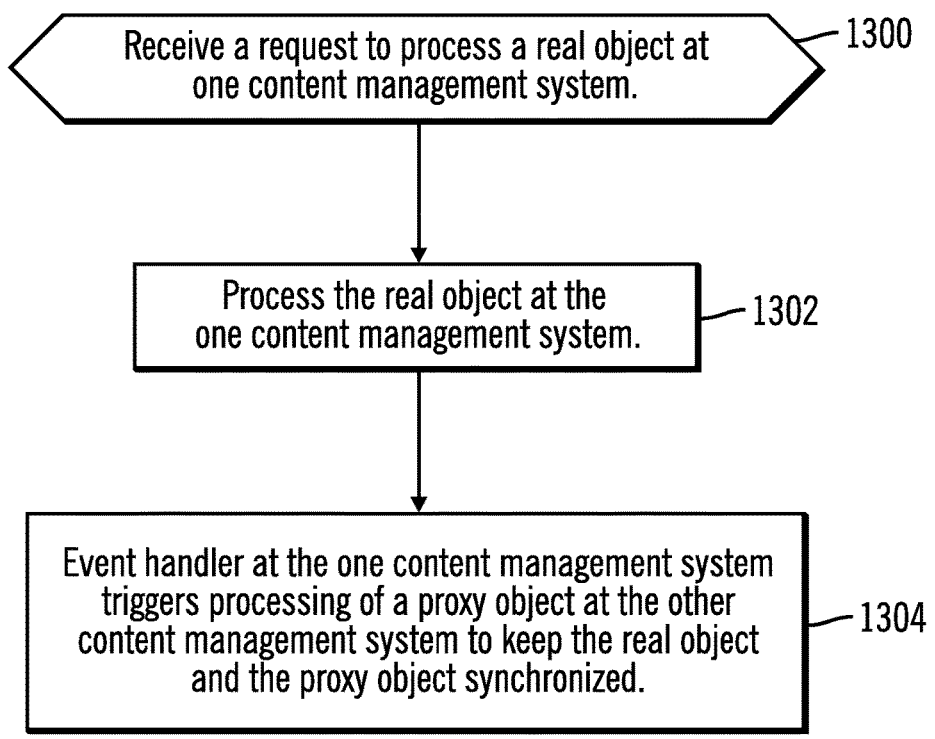
FIG. 13 illustrates, in a flow diagram, operations for synchronization in accordance with certain embodiments.

FIG. 13 illustrates, in a flow diagram, operations for synchronization in accordance with certain embodiments. Control begins at block 1300 with receiving a request to process a real object at one content management system 110, 130. In block 1302, the real object is processed at the one content management system. In block 1304, an event handler at the one content management system triggers processing of a proxy object at the other content management system to keep the real object and the proxy object synchronized.

Cloud Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 14:
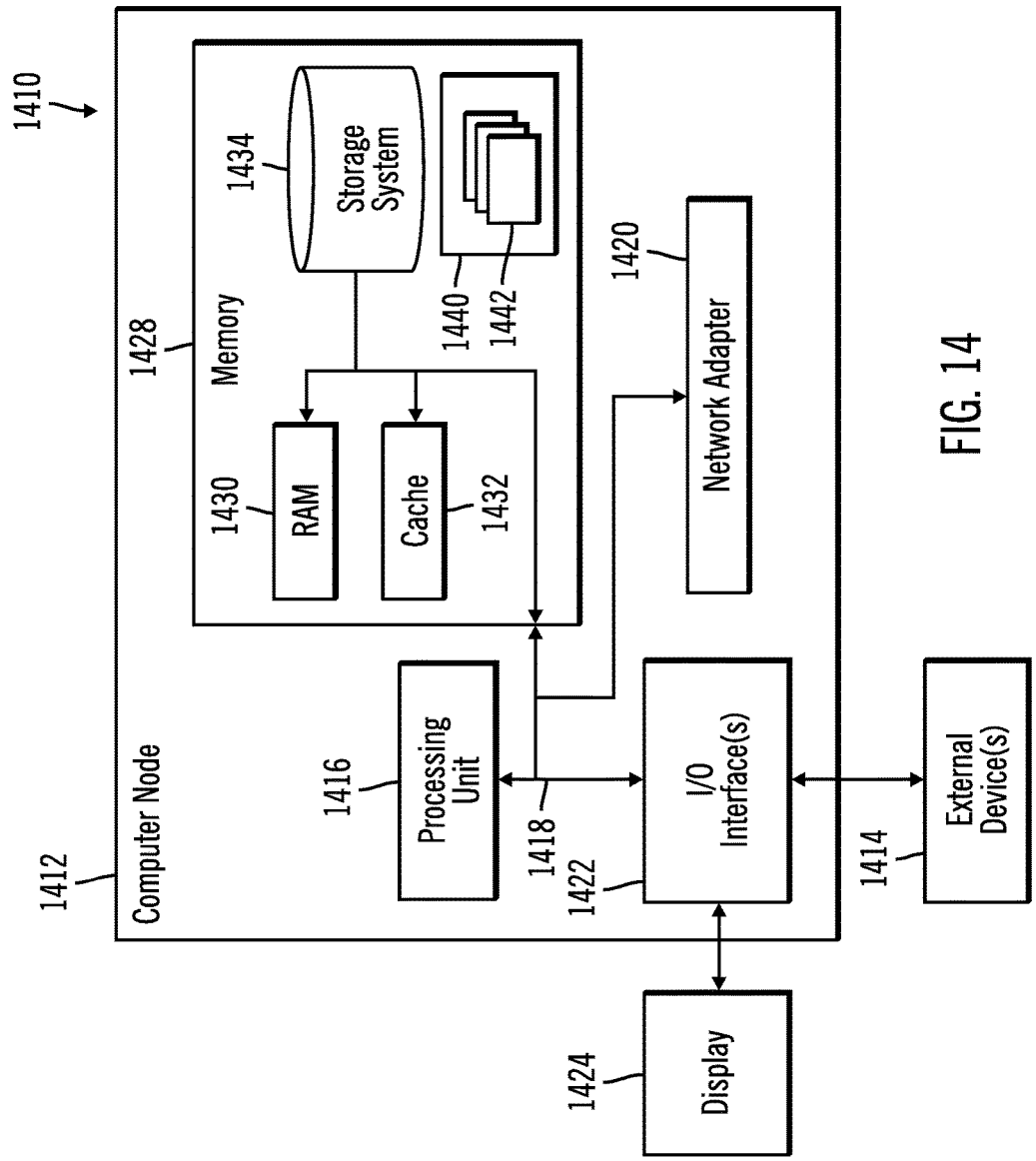
FIG. 14 illustrates, in a block diagram, a cloud computing node in accordance with certain embodiments.

Referring now to FIG. 14, a schematic of an example of a cloud computing node is shown. Cloud computing node 1410 is only one example of a suitable cloud computing node and is not intended to suggest any limitation as to the scope of use or functionality of embodiments of the invention described herein. Regardless, cloud computing node 1410 is capable of being implemented and/or performing any of the functionality set forth hereinabove.

In cloud computing node 1410 there is a computer system/server 1412, which is operational with numerous other general purpose or special purpose computing system environments or configurations. Examples of well-known computing systems, environments, and/or configurations that may be suitable for use with computer system/server 1412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1412 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 14, computer system/server 1412 in cloud computing node 1410 is shown in the form of a general-purpose computing device. The components of computer system/server 1412 may include, but are not limited to, one or more processors or processing units 1416, a system memory 1428, and a bus 1418 that couples various system components including system memory 1428 to a processor or processing unit 1416.

Bus 1418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1412 typically includes a variety of computer system readable media. Such media may be any available media that is accessible by computer system/server 1412, and it includes both volatile and non-volatile media, removable and non-removable media.

System memory 1428 can include computer system readable media in the form of volatile memory, such as random access memory (RAM) 1430 and/or cache memory 1432. Computer system/server 1412 may further include other removable/non-removable, volatile/non-volatile computer system storage media. By way of example only, storage system 1434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1418 by one or more data media interfaces. As will be further depicted and described below, memory 1428 may include at least one program product having a set (e.g., at least one) of program modules that are configured to carry out the functions of embodiments of the invention.

Program/utility 1440, having a set (at least one) of program modules 1442, may be stored in memory 1428 by way of example, and not limitation, as well as an operating system, one or more application programs, other program modules, and program data. Each of the operating system, one or more application programs, other program modules, and program data or some combination thereof, may include an implementation of a networking environment. Program modules 1442 generally carry out the functions and/or methodologies of embodiments of the invention as described herein.

Computer system/server 1412 may also communicate with one or more external devices 1414 such as a keyboard, a pointing device, a display 1424, etc.; one or more devices that enable a user to interact with computer system/server 1412; and/or any devices (e.g., network card, modem, etc.) that enable computer system/server 1412 to communicate with one or more other computing devices. Such communication can occur via Input/Output (I/O) interfaces 1422. Still yet, computer system/server 1412 can communicate with one or more networks such as a local area network (LAN), a general wide area network (WAN), and/or a public network (e.g., the Internet) via network adapter 1420. As depicted, network adapter 1420 communicates with the other components of computer system/server 1412 via bus 1418. It should be understood that although not shown, other hardware and/or software components could be used in conjunction with computer system/server 1412. Examples, include, but are not limited to: microcode, device drivers, redundant processing units, external disk drive arrays, RAID systems, tape drives, and data archival storage systems, etc.

Figure 15:
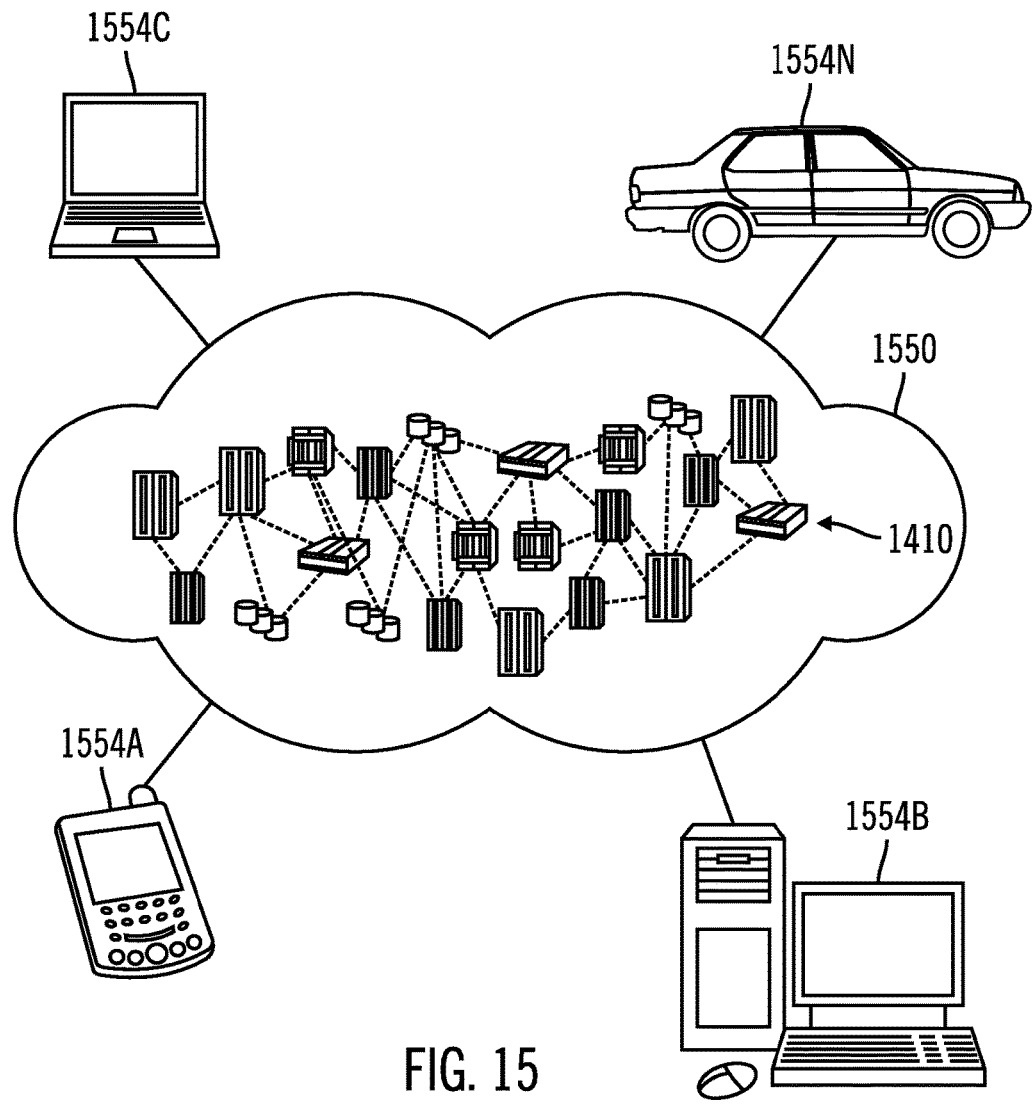
FIG. 15 illustrates, in a block diagram, a cloud computing environment in accordance with certain embodiments.

Referring now to FIG. 15, illustrative cloud computing environment 1550 is depicted. As shown, cloud computing environment 1550 comprises one or more cloud computing nodes 1410 with which local computing devices used by cloud consumers, such as, for example, personal digital assistant (PDA) or cellular telephone 1554A, desktop computer 1554B, laptop computer 1554C, and/or automobile computer system 1554N may communicate. Nodes 1410 may communicate with one another. They may be grouped (not shown) physically or virtually, in one or more networks, such as Private, Community, Public, or Hybrid clouds as described hereinabove, or a combination thereof. This allows cloud computing environment 1550 to offer infrastructure, platforms and/or software as services for which a cloud consumer does not need to maintain resources on a local computing device. It is understood that the types of computing devices 1554A-N shown in FIG. 15 are intended to be illustrative only and that computing nodes 1410 and cloud computing environment 1550 can communicate with any type of computerized device over any type of network and/or network addressable connection (e.g., using a web browser).

Figure 16:
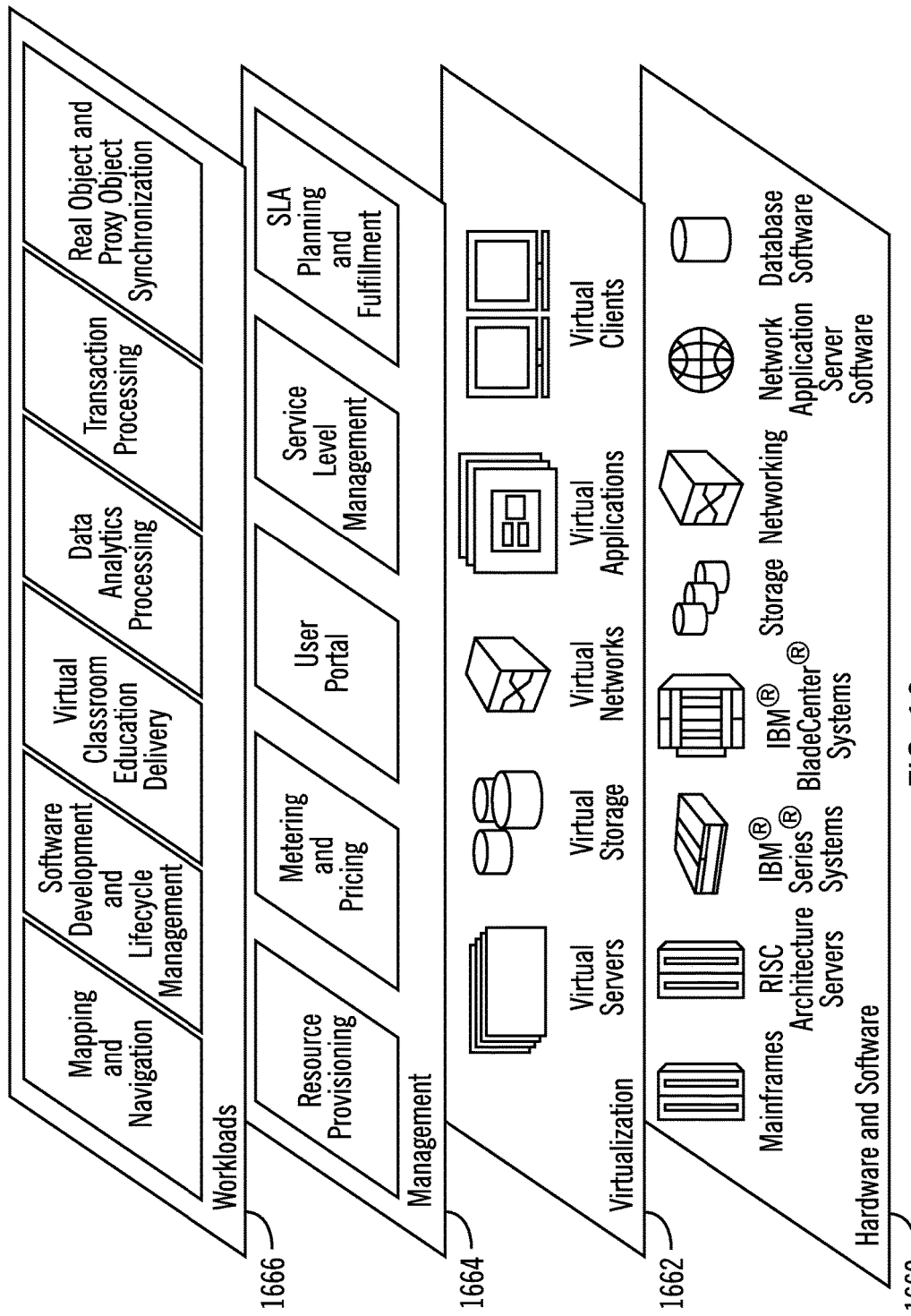
FIG. 16 illustrates, in a block diagram, abstraction model layers in accordance with certain embodiments.

Referring now to FIG. 16, a set of functional abstraction layers provided by cloud computing environment 1550 (FIG. 15) is shown. It should be understood in advance that the components, layers, and functions shown in FIG. 16 are intended to be illustrative only and embodiments of the invention are not limited thereto. As depicted, the following layers and corresponding functions are provided:

Hardware and software layer 1660 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2®, database software. (IBM, zSeries, pSeries, xSeries, BladeCenter, WebSphere, and DB2 are trademarks of International Business Machines Corporation registered in many jurisdictions worldwide).

Virtualization layer 1662 provides an abstraction layer from which the following examples of virtual entities may be provided: virtual servers; virtual storage; virtual networks, including virtual private networks; virtual applications and operating systems; and virtual clients.

In one example, management layer 1664 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide prearrangement for, and procurement of, cloud computing resources for which a future requirement is anticipated in accordance with an SLA.

Workloads layer 1666 provides examples of functionality for which the cloud computing environment may be utilized. Examples of workloads and functions which may be provided from this layer include: mapping and navigation; software development and lifecycle management; virtual classroom education delivery; data analytics processing; transaction processing; and real object and proxy object synchronization.

Thus, in certain embodiments, software or a program, implementing real object and proxy object synchronization in accordance with embodiments described herein, is provided as a service in a cloud environment.

In certain embodiments, the content management system C1 110, the content management system C2 120, and/or the workflow process management system 140 has the architecture of computing node 110. In certain embodiments, the content management system C1 110, the content management system C2 120, and/or the workflow process management system 140 is part of a cloud environment. In certain alternative embodiments, the content management system C1 110, the content management system C2 120, and/or the workflow process management system 140 is not part of a cloud environment.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, solid state memory, magnetic tape or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational processing (e.g., operations or steps) to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the flow diagrams show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

The invention claimed is:

1. A method comprising:
by a processor(s) set of first and second content management systems that executes first and second respective event infrastructures and that is programmed to improve query performance and file browsing performance across multiple content repositories while keeping the multiple content repositories operationally isomorphic without full data replication by:
designating the first content management system to store local proxy objects that represent real objects for root case instance folders stored and managed remotely by the second content management system, real objects for documents, and real objects for other folders in a first folder sub-hierarchy, where the local proxy objects (i) omit metadata and properties of the respective real objects for the root case instance folders, (ii) include a global identifier that provides an external reference to the respective real objects for the root case instance folders, and (iii) are controlled remotely according to a first set of synchronous remote procedure calls (S-RPCs) issued from the second event infrastructure of the second content management system, and where the first set of S-RPCs invoke and ensure completion of matching local case folder operations on the local proxy objects in synchronization with completion of remote root case instance folder operations performed on the real objects for the root case instance folders in the second content management system;
designating the second content management system to store the real objects for the root case instance folders, local proxy objects that represent the real objects for the documents stored remotely in the first content management system, and local proxy objects that represent the real objects for the other folders stored remotely in the first content management system in a second folder sub-hierarchy, where the respective local proxy objects (i) omit metadata and properties of the respective real objects for the documents and the respective real objects for the other folders, (ii) include a global identifier that provides an external reference to the respective real objects for the documents and the respective real objects for the other folders, and (iii) are controlled remotely according to a second set of synchronous remote procedure calls (S-RPCs) issued from the first event infrastructure of the first content management system, and where the second set of S-RPCs invoke and ensure completion of matching local document and local other folder operations in synchronization with completion of remote document and other folder operations performed on the real objects for the documents and the real objects for the other folders in the first content management system;

in response to receiving a first real-time operation to modify one of 1) a real object for a document among the real objects for the documents and 2) a real object for another folder among the real objects for the other folders, causing the first content management system to process the first real-time operation that results in triggering of a first S-RPC by the first event infrastructure of the first content management system that controls synchronous updating of the respective real object stored at the first content management system and of the corresponding respective proxy object stored at the second content management system under control of the first S-RPC issued by the first event infrastructure of the first content management system; and in response to receiving a second real-time operation to modify a real object for a root case instance folder among the real objects for the root case instance folders, causing the second content management system to process the second real-time operation that results in triggering of a second S-RPC by the second event infrastructure of the second content management system that controls synchronous updating of the real object for the root case instance folder stored at the second content management system and of the corresponding proxy object of the root case instance folder stored at the first content management system under control of the second S-RPC issued by the second event infrastructure of the second content management system;

where distribution of the storage of the respective real objects and distribution of the synchronous control of updating of the respective proxy objects between the first and second content management systems provides automated computer-controlled device integration that improves the query performance and the file browsing performance while keeping the first and second content management systems operationally isomorphic without full data replication, which further reduces storage by eliminating conventional storage of full mirror copies of the respective real objects.

2. The method of claim 1, where the first real-time operation is one of creating, updating, deleting, filing, unfiling, and querying.

3. The method of claim 1, where the real object includes an attribute that is used to access the corresponding proxy object.

4. The method of claim 1, further comprising the processor(s) set:
providing a workflow process management system coupled to a workflow queue database and coupled to a case management system, the first content management system and the second content management system.

5. The method of claim 4, further comprising the processor(s) set:
causing the case management system to issue real-time requests to the workflow process management system, the first content management system, and the second content management system.

6. The method of claim 1, where a Software as a Service (SaaS) is provided to perform the method.

7. A computer program product, the computer program product comprising:
a non-transitory computer readable storage medium having computer readable program code embodied therewith, the computer readable program code, when executed by a processor(s) set of first and second content management systems, is configured to execute first and second respective event infrastructures and is configured to improve query performance and file browsing performance across multiple content repositories while keeping the multiple content repositories operationally isomorphic without full data replication by:
designating the first content management system to store local proxy objects that represent real objects for root case instance folders stored and managed remotely by the second content management system, real objects for documents, and real objects for other folders in a first folder sub-hierarchy, where the local proxy objects i) omit metadata and properties of the respective real objects for the root case instance folders, (ii) include a global identifier that provides an external reference to the respective real objects for the root case instance folders, and (iii) are controlled remotely according to a first set of synchronous remote procedure calls (S-RPCs) issued from the second event infrastructure of the second content management system, and where the first set of S-RPCs invoke and ensure completion of matching local case folder operations on the local proxy objects in synchronization with completion of remote root case instance folder operations performed on the real objects for the root case instance folders in the second content management system;
designating the second content management system to store the real objects for the root case instance folders, local proxy objects that represent the real objects for the documents stored remotely in the first content management system, and local proxy objects that represent the real objects for the other folders stored remotely in the first content management system in a second folder sub-hierarchy, where the respective local proxy objects (i) omit metadata and properties of the respective real objects for the documents and the respective real objects for the other folders, (ii) include a global identifier that provides an external reference to the respective real objects for the documents and the respective real objects for the other folders, and (iii) are controlled remotely according to a second set of synchronous remote procedure calls (S-RPCs) issued from the first event infrastructure of the first content management system, and where the second set of S-RPCs invoke and ensure completion of matching local document and local other folder operations in synchronization with completion of remote document and other folder operations performed on the real objects for the documents and the real objects for the other folders in the first content management system;

in response to receiving a first real-time operation to modify one of 1) a real object for a document among the real objects for the documents and 2) a real object for another folder among the real objects for the other folders, causing the first content management system to process the first real-time operation that results in triggering of a first S-RPC by the first event infrastructure of the first content management system that controls synchronous updating of the respective real object stored at the first content management system and of the corresponding respective proxy object stored at the second content management system under control of the first S-RPC issued by the first event infrastructure of the first content management system; and in response to receiving a second real-time operation to modify a real object for a root case instance folder among the real objects for the root case instance folders, causing the second content management system to process the second real-time operation that results in triggering of a second S-RPC by the second event infrastructure of the second content management system that controls synchronous updating of the real object for the root case instance folder stored at the second content management system and of the corresponding proxy object of the root case instance folder stored at the first content management system under control of the second S-RPC issued by the second event infrastructure of the second content management system;

where distribution of the storage of the respective real objects and distribution of the synchronous control of updating of the respective proxy objects between the first and second content management systems provides automated computer-controlled device integration that improves the query performance and the file browsing performance while keeping the first and second content management systems operationally isomorphic without full data replication, which further reduces storage by eliminating conventional storage of full mirror copies of the respective real objects.

8. The computer program product of claim 7, the first real-time operation is one of creating, updating, deleting, filing, unfiling, and querying.

9. The computer program product of claim 7, where the real object includes an attribute that is used to access the corresponding proxy object.

10. The computer program product of claim 7, where the computer readable program code, when executed by the processor(s) set of the first and second content management systems, is configured to perform:
providing a workflow process management system coupled to a workflow queue database, a case management system, the first content management system, and the second content management system.

11. The computer program product of claim 10, where the computer readable program code, when executed by the processor(s) set of the first and second content management systems, is configured to perform:
causing the case management system to issue real-time requests to the workflow process management system, the first content management system, and the second content management system.

12. The computer program product of claim 7, where a Software as a Service (SaaS) is configured to perform the computer program product operations.

13. A computer system, comprising:
a processor(s) set of first and second content management systems that executes first and second respective event infrastructures and that is programmed to improve query performance and file browsing performance across multiple content repositories while keeping the multiple content repositories operationally isomorphic without full data replication; and
a storage device connected to the processor(s) set, where the storage device has stored thereon a program, where the processor(s) set is configured to execute instructions of the program to perform operations, and where the operations comprise:
designating the first content management system to store local proxy objects that represent real objects for root case instance folders stored and managed remotely by the second content management system, real objects for documents, and real objects for other folders in a first folder sub-hierarchy, where the local proxy objects (i) omit metadata and properties of the respective real objects for the root case instance folders, (ii) include a global identifier that provides an external reference to the respective real objects for the root case instance folders, and (iii) are controlled remotely according to a first set of synchronous remote procedure calls (S-RPCs) issued from the second event infrastructure of the second content management system, and where the first set of S-RPCs invoke and ensure completion of matching local case folder operations on the local proxy objects in synchronization with completion of remote root case instance folder operations performed on the real objects for the root case instance folders in the second content management system;
designating the second content management system to store the real objects for the root case instance folders, local proxy objects that represent the real objects for the documents stored remotely in the first content management system, and local proxy objects that represent the real objects for the other folders stored remotely in the first content management system in a second folder sub-hierarchy, where the respective local proxy objects (i) omit metadata and properties of the respective real objects for the documents and the respective real objects for the other folders, (ii) include a global identifier that provides an external reference to the respective real objects for the documents and the respective real objects for the other folders, and (iii) are controlled remotely according to a second set of synchronous remote procedure calls (S-RPCs) issued from the first event infrastructure of the first content management system, and where the second set of S-RPCs invoke and ensure completion of matching local document and local other folder operations in synchronization with completion of remote document and other folder operations performed on the real objects for the documents and the real objects for the other folders in the first content management system;

in response to receiving a first real-time operation to modify one of 1) a real object for a document among the real objects for the documents and 2) a real object for another folder among the real objects for the other folders, causing the first content management system to process the first real-time operation that results in triggering of a first S-RPC by the first event infrastructure of the first content management system that controls synchronous updating of the respective real object stored at the first content management system and of the corresponding respective proxy object stored at the second content management system under control of the first S-RPC issued by the first event infrastructure of the first content management system; and in response to receiving a second real-time operation to modify a real object for a root case instance folder among the real objects for the root case instance folders, causing the second content management system to process the second real-time operation that results in triggering of a second S-RPC by the second event infrastructure of the second content management system that controls synchronous updating of the real object for the root case instance folder stored at the second content management system and of the corresponding proxy object of the root case instance folder stored at the first content management system under control of the second S-RPC issued by the second event infrastructure of the second content management system;

where distribution of the storage of the respective real objects and distribution of the synchronous control of updating of the respective proxy objects between the first and second content management systems provides automated computer-controlled device integration that improves the query performance and the file browsing performance while keeping the first and second content management systems operationally isomorphic without full data replication, which further reduces storage by eliminating conventional storage of full mirror copies of the respective real objects.

14. The computer system of claim 13, where the first real-time operation is one of creating, updating, deleting, filing, unfiling, and querying.

15. The computer system of claim 13, where the real object includes an attribute that is used to access the corresponding proxy object.

16. The computer system of claim 13, where the operations further comprise:

providing a workflow process management system coupled to a workflow queue database, a case management system, the first content management system, and the second content management system.

17. The computer system of claim 16, where the operations further comprise:

causing the case management system to issue real-time requests to the workflow process management system, the first content management system, and the second content management system.

18. The computer system of claim 13, where a Software as a Service (SaaS) is provided to perform the system operations.

* * * * *